United States Patent
Yasui et al.

(10) Patent No.: US 9,604,622 B2
(45) Date of Patent: Mar. 28, 2017

(54) ELECTRIC BRAKING SYSTEM FOR VEHICLE

(71) Applicants: Yoshiyuki Yasui, Nagoya (JP); Hiroyuki Kodama, Kariya (JP); Yusuke Oshio, Anjo (JP)

(72) Inventors: Yoshiyuki Yasui, Nagoya (JP); Hiroyuki Kodama, Kariya (JP); Yusuke Oshio, Anjo (JP)

(73) Assignee: ADVICS CO., LTD., Kariya, Aichi-Pref. (JP)

( * ) Notice: Subject to any disclaimer, the term of this patent is extended or adjusted under 35 U.S.C. 154(b) by 21 days.

(21) Appl. No.: 14/776,242

(22) PCT Filed: Mar. 17, 2014

(86) PCT No.: PCT/JP2014/057143
§ 371 (c)(1),
(2) Date: Sep. 14, 2015

(87) PCT Pub. No.: WO2014/142335
PCT Pub. Date: Sep. 18, 2014

(65) Prior Publication Data
US 2016/0031427 A1    Feb. 4, 2016

(30) Foreign Application Priority Data

Mar. 15, 2013  (JP) ................. 2013-052733
Mar. 15, 2013  (JP) ................. 2013-052734

(51) Int. Cl.
| | |
|---|---|
| *B60T 17/22* | (2006.01) |
| *B60T 8/171* | (2006.01) |
| *B60T 13/74* | (2006.01) |

(52) U.S. Cl.
CPC ............. *B60T 17/22* (2013.01); *B60T 8/171* (2013.01); *B60T 13/741* (2013.01)

(58) Field of Classification Search
CPC ........ B60T 13/741; B60T 17/22; B60T 8/171; H01S 3/0675; H01S 3/094076; H01S 3/1301; H01S 3/1305; H01S 3/1312
(Continued)

(56) References Cited

U.S. PATENT DOCUMENTS 6,270,172 B1 * 8/2001 Shirai ................. B60T 7/042
303/112
6,397,981 B1 * 6/2002 Tamasho ............. B60T 13/741
188/156

(Continued)

FOREIGN PATENT DOCUMENTS

| JP | 2000-213575 A | 8/2000 |
| JP | 2003-063376 A | 3/2003 |

(Continued)

OTHER PUBLICATIONS

International Search Report (PCT/ISA/210) mailed on Jun. 3, 2014, by the Japanese Patent Office as the International Searching Authority for International Application No. PCT/JP2014/057143.

*Primary Examiner* — Tyler J Lee
(74) *Attorney, Agent, or Firm* — Buchanan Ingersoll & Rooney PC

(57) ABSTRACT

A vehicle electric braking device wherein: a first degree of contribution associated with the actual pressing force value and a second degree of contribution associated with an estimated pressing force value, are determined based on operation amount of a braking operation member; the second degree of contribution is determined to be larger than the first degree when the operation amount is small; the first degree of contribution is determined to be larger than the second when the operation amount is large; a combined pressing force is calculated based on a value obtained by accounting for the first degree of contribution in the actual pressing force value and a value obtained by accounting for (Continued)

the second degree of contribution in the estimated pressing force value; and an electric motor target power supply amount is calculated based on the combined pressing force and a target pressing force calculated from the operation amount.

2 Claims, 9 Drawing Sheets

(58) Field of Classification Search
USPC .......................................... 701/70; 303/20, 28
See application file for complete search history.

(56) References Cited

U.S. PATENT DOCUMENTS

| | | | |
|---|---|---|---|
| 6,496,768 B2* | 12/2002 | Yamamoto | B60T 8/3255 303/115.2 |
| 7,198,336 B2* | 4/2007 | Yamamoto | B60T 7/042 188/158 |
| 8,706,375 B2* | 4/2014 | Ajiro | B60T 7/042 180/170 |
| 2002/0026272 A1* | 2/2002 | Yamamoto | B60T 8/3255 701/70 |
| 2004/0104618 A1* | 6/2004 | Yamamoto | B60T 7/042 303/20 |
| 2013/0049449 A1* | 2/2013 | Watanabe | B60T 1/10 303/3 |
| 2013/0289845 A1* | 10/2013 | Ajiro | B60T 7/042 701/70 |

FOREIGN PATENT DOCUMENTS

| | | |
|---|---|---|
| JP | 2005-106153 A | 4/2005 |
| JP | 2006-219133 A | 8/2006 |

* cited by examiner (b) CROSS-SECTIONAL VIEW OF POWER TRANSMITTING PORTION (FITTED PORTION BETWEEN PROTRUSION OF HBM AND RECESS OF SLD)

(a) SCHEMATIC VIEW OF OLDHAM COUPLING

ELECTRIC BRAKING SYSTEM FOR VEHICLE

TECHNICAL FIELD

The invention relates to an electric braking system for a vehicle.

BACKGROUND ART

Patent Document 1 describes an electric braking system in which a zero-point offset (drift) of pressing force detecting means for detecting a pressing force that a friction member is pressed against a rotary member is corrected and the accuracy of feedback control over the pressing force may be improved.

Patent Document 2 describes an electric braking system that includes pressing force detecting means for detecting a pressing force and position detecting means for detecting a displacement of a thrust mechanism. The electric braking system detects an abnormality of the pressing force detecting means from the correlation between a pressing force signal of the pressing force detecting means and a displacement signal of the position detecting means. Specifically, it is described in Patent Document 2 that the process of detecting an abnormality of a piston thrust sensor is performed on the basis of the relationship between a piston thrust sensor and a motor position, which is determined on the basis of an elastic deformation amount of an electric caliper mechanism portion and an elastic deformation amount of a brake pad.

RELATED ART DOCUMENT

Patent Document

Patent Document 1: Japanese Patent Application Publication No. 2000-213575 (JP 2000-213575 A)
Patent Document 2: Japanese Patent Application Publication No. 2005-106153 (JP 2005-106153 A)

SUMMARY OF THE INVENTION

Incidentally, in braking torque control by an electromechanical braking system (so-called electric brake, and called EMB (electro-mechanical brake)), a force (pressing force) that a friction member (for example, a brake pad) is pressed against a rotary member (for example, a brake disc) is subjected to feedback control. The characteristic of the pressing force to the position (rotation angle) of an electric motor (that is, the characteristic of the stiffness of the overall braking system) has a downward convex shape as shown in FIG. 7. Therefore, the sensitivity of detecting a pressing force (a variation in pressing force to a displacement) is sufficiently high in a region in which the pressing force is large; however, the sensitivity is low in a region in which the pressing force is small. For example, a gradient of change gcpa at point A is lower than a gradient of change gcpb at point B.

In order for the above-described pressing force feedback control to be smoothly and accurately executed, it is desired to minutely adjust a braking torque near a position at which the braking torque of the electric motor begins to be generated (for example, a position at which the brake pad begins to contact with the brake disc, and is also referred to as initial position), that is, in a region in which a vehicle deceleration is small. For this purpose, it is desired that the resolution of detecting the pressing force is high in the region in which the vehicle deceleration is small.

On the other hand, in the braking system, it is desired that a generated deceleration to a braking operation amount does not fluctuate for each braking operation (that is, the relationship is constant) with an increase in the vehicle deceleration. For this purpose, feedback control having a high reliability (that is, based on a pressing force having a smaller error from a true value) is desired in a region in which the vehicle deceleration is large.

In addition, in the above-described braking system, particularly, when the pressing force is increased, it is desired that a generated deceleration to a braking operation amount does not fluctuate for each braking operation (that is, the relationship is constant) with an increase in vehicle deceleration. For this purpose, feedback control having a high reliability (that is, based on a pressing force having a smaller error from a true value) is desired when the pressing force is increased.

In the above-described pressing force feedback control, an energization amount to the electric motor is determined on the basis of a deviation between a target value (control target) and actual value (the detected result of the pressing force detecting means) of the pressing force. When the actual pressing force value includes an error, the deviation may be increased unnecessarily, with the result that the energization amount to the electric motor may be excessive. For example, when the actual pressing force value does not change although the target pressing force value has changed, the energization amount to the electric motor is increased by the pressing force feedback control. Particularly, when the pressing force is reduced, a contact state in transmission of power switches (for example, when a gear speed reducer is employed, contacting tooth flanks switch) because of rattles of mechanical elements (a backlash of the speed reducer, clearances in a shaft coupling, and the like). As a result of switching of the contact state, there may occur a state where a rotation angle Mka of the electric motor changes but an actual value Fba of the pressing force does not change. That is, as shown in FIG. 9, an ineffective displacement (ineffective rotation angle) arises in the rotation angle Mka of the electric motor over a displacement mkm because of rattles (clearances) of the mechanical elements, and unnecessary energization is carried out to the electric motor. From the viewpoint of power saving, when the pressing force is reduced, it is desired to reduce unnecessary energization based on the ineffective displacement. When a brushed motor is employed as the electric motor, the energization amount to the motor brush influences the durability of the electric motor. From this viewpoint as well, it is desired to suppress the above-described unnecessary energization.

The invention is contemplated to address the above-described problem, and it is an object of the invention to provide an electric braking system that is able to execute pressing force feedback control that has a high resolution of detecting a pressing force in a region in which a vehicle deceleration is small and that has a high reliability in a region in which the vehicle deceleration is large.

It is also an object of the invention to provide an electric braking system that is able to execute pressing force feedback control having a high reliability when the pressing force is increased and that can suppress unnecessary energization to an electric motor due to an ineffective displacement (ineffective rotation angle) of the electric motor when the pressing force is reduced.

An electric braking system for a vehicle according to the invention includes operation amount acquisition means (BPA) for acquiring a driver's operation amount (Bpa) of a braking operation member (BP) of the vehicle, braking means (BRK) for generating a braking torque in a wheel (WHK) of the vehicle by transmitting power of an electric motor (MTR) via a transmission member (GSK, and the like) to press a friction member (MSB) against a rotary member (KTB) fixed to the wheel (WHL), and control means (CTL) for computing a target energization amount (Imt) on the basis of the operation amount (Bpa) and controlling the electric motor (MTR) on the basis of the target energization amount (Imt).

The system is characterized in that the system includes pressing force acquisition means (FBA) for acquiring an actual pressing force value (Fba) that is an actual value (detected value) of a force that the friction member (MSB) presses the rotary member (KTB), and position acquisition means (MKA) for acquiring a position (Mka) of the electric motor (MTR), and the control means (CTL) is configured to compute an estimated pressing force value (Fbe) that is an estimated value of the force that the friction member (MSB) presses the rotary member (KTB) on the basis of the position (Mka), determine a first contribution degree (Ka1) for the actual pressing force value (Fba) and a second contribution degree (Ke2) for the estimated pressing force value (Fbe) on the basis of the operation amount (Bpa), determine the second contribution degree (Ke2) as a relatively larger value than the first contribution degree (Ka1) when the operation amount (Bpa) is small, and determine the first contribution degree (Ka1) as a relatively larger value than the second contribution degree (Ke2) when the operation amount (Bpa) is large, and compute the target energization amount (Imt) on the basis of a value (Fbxa) that is obtained from the actual pressing force value (Fba) in consideration of the first contribution degree (Ka1) and a value (Fbxe) that is obtained from the estimated pressing force value (Fbe) in consideration of the second contribution degree (Ke2).

Generally, the actual pressing force value is input to the control means via analog-digital conversion means. Therefore, the resolution of detecting a pressing force depends on the performance (resolution) of analog-to-digital conversion (AD conversion). On the other hand, an actual position (rotation angle) of the electric motor, which is used to compute the estimated pressing force value, is taken into the control means as a digital signal from a Hall IC or a resolver. In addition, the output of the electric motor is reduced in speed by the transmission member and converted to the pressing force. From the above viewpoint, the estimated pressing force value has a higher resolution of the pressing force than the actual pressing force value.

On the other hand, the estimated pressing force value is computed on the basis of the stiffness value (spring constant) of the braking means (brake actuator). The stiffness value fluctuates on an abrasion state, and the like, of the friction member. For example, when the friction member partially abrades, the stiffness value decreases. Therefore, from this viewpoint, the actual pressing force value has a higher reliability (smaller error from a true value of the pressing force) than the estimated pressing force value.

The characteristic of the pressing force to the electric motor position (that is, a change in the spring constant of the overall braking system) is nonlinear, and has a downward convex shape (see FIG. 7). Therefore, in a region in which the pressing force is large, because the detection sensitivity of the pressing force (a variation in pressing force to a displacement) is sufficiently high, the actual pressing force value is usable for the pressing force feedback control. On the other hand, in a region in which the pressing force is small, because the detection sensitivity of the actual pressing force value is low, the estimated pressing force value is desirably employed for the pressing force feedback control in addition to (or instead of) the actual pressing force value.

The above-described configuration is based on the knowledge. That is, when the braking operation amount is small, the first contribution degree is computed to a relatively small value, and the second contribution degree is computed to a relatively large value. That is, the estimated pressing force value has a larger influence degree on the pressing force feedback control than the actual pressing force value. As a result, in the region in which the pressing force is small (that is, the region in which the braking operation amount is small and the braking torque is small), which requires minute adjustment of the braking torque, the resolution of detecting a generated pressing force is improved, and precise pressing force feedback control can be executed.

On the other hand, when the braking operation amount is small, the first contribution degree Ka1 is computed to a relatively small value, and the second contribution degree is computed to a relatively large value. That is, the actual pressing force value has a larger influence degree on the pressing force feedback control than the estimated pressing force value. As a result, in the region in which the pressing force is large (that is, the braking operation amount is large and the braking torque is large), which requires that the correlation of the vehicle deceleration to the braking operation amount be constant, the pressing force feedback control having a high reliability (that is, having a smaller error from a true value) can be executed.

An electric braking system for a vehicle according to the invention includes operation amount acquisition means (BPA) for acquiring a driver's operation amount (Bpa) of a braking operation member (BP) of the vehicle, braking means (BRK) for generating a braking torque in a wheel (WHK) of the vehicle by transmitting power of an electric motor (MTR) via a transmission member (GSK, and the like) to press a friction member (MSB) against a rotary member (KTB) fixed to the wheel (WHL), and control means (CTL) for computing a target energization amount (Imt) on the basis of the operation amount (Bpa) and controlling the electric motor (MTR) on the basis of the target energization amount (Imt).

The system is characterized in that the system includes pressing force acquisition means (FBA) for acquiring an actual pressing force value (Fba) that is an actual value (detected value) of a force that the friction member (MSB) presses the rotary member (KTB), and position acquisition means (MKA) for acquiring a position (Mka) of the electric motor (MTR), and the control means (CTL) is configured to, within a predetermined range of the operation amount (Bpa), including zero ($0 \leq Bpa < ba3$), when the operation amount (Bpa) increases, compute the target energization amount (Imt) on the basis of at least the actual pressing force value (Fba) such that the electric motor (MTR) is rotated in one direction, and, when the operation amount (Bpa) reduces, compute the target energization amount (Imt) on the basis of only the position (Mka) such that the electric motor (MTR) is rotated in the other direction.

Generally, the actual pressing force value is input to the control means via analog-digital conversion means. Therefore, the resolution of detecting a pressing force depends on the performance (resolution) of analog-to-digital conversion (AD conversion). On the other hand, an actual position (rotation angle) of the electric motor is taken into the control means as a digital signal from a Hall IC or a resolver. In addition, the output of the electric motor is reduced in speed by the transmission member and converted to the pressing force. From the above viewpoint, the pressing force (estimated pressing force value) that is obtained on the basis of the position of the electric motor has a higher resolution of the pressing force than the actual pressing force value.

On the other hand, the estimated pressing force value is computed on the basis of the stiffness value (spring constant) of the braking means (brake actuator). The stiffness value fluctuates on an abrasion state, and the like, of the friction member. For example, when the friction member partially abrades, the stiffness value decreases. Therefore, from this viewpoint, when the pressing force is increased, the actual pressing force value has a higher reliability (smaller error from a true value of the pressing force) than the estimated pressing force value.

The characteristic of the pressing force to the electric motor position (that is, a change in the spring constant of the overall braking system) is nonlinear, and has a downward convex shape (see FIG. 9). Therefore, in a region in which the pressing force is large, because the detection sensitivity of the pressing force (a variation in pressing force to a displacement) is sufficiently high, the actual pressing force value is usable for the pressing force feedback control. On the other hand, in a region in which the pressing force is small, because the detection sensitivity of the actual pressing force value is low, the estimated pressing force value is desirably employed for the pressing force feedback control in addition to (or instead of) the actual pressing force value. Moreover, in the case where the pressing force is reduced, during the ineffective displacement (ineffective rotation angle) of the electric motor as well, the estimated pressing force value continues to reduce as long as the rotation angle of the electric motor is changing.

The above-described configuration is based on the knowledge. That is, within the predetermined range of the operation amount, including zero, when the operation amount increases, the target energization amount is computed on the basis of at least the actual pressing force value such that the electric motor is rotated in one direction. Therefore, in the case where the pressing force is increased, the pressing force feedback control having a high reliability (having a small error from a true value) can be executed.

Within the predetermined range of the operation amount, including zero, when the operation amount reduces, the target energization amount is computed on the basis of only the position of the electric motor such that the electric motor is rotated in the other direction. Therefore, by setting the predetermined range such that the ineffective displacement (ineffective rotation angle) of the electric motor arises within the predetermined range, in the case where the pressing force is reduced, during the ineffective displacement (ineffective rotation angle) of the electric motor as well, the pressing force (the estimated pressing force value), which is compared with the target pressing force value (control target) in the pressing force feedback control, continues to reduce as long as the rotation angle of the electric motor is changing. As a result, in the case where the pressing force reduces, unnecessary energization to the electric motor due to the ineffective displacement (ineffective rotation angle) of the electric motor can be suppressed.

MODES FOR CARRYING OUT THE INVENTION

Hereinafter, an electric braking system for a vehicle according to an embodiment of the invention will be described with reference to the drawings.

Figure 1:
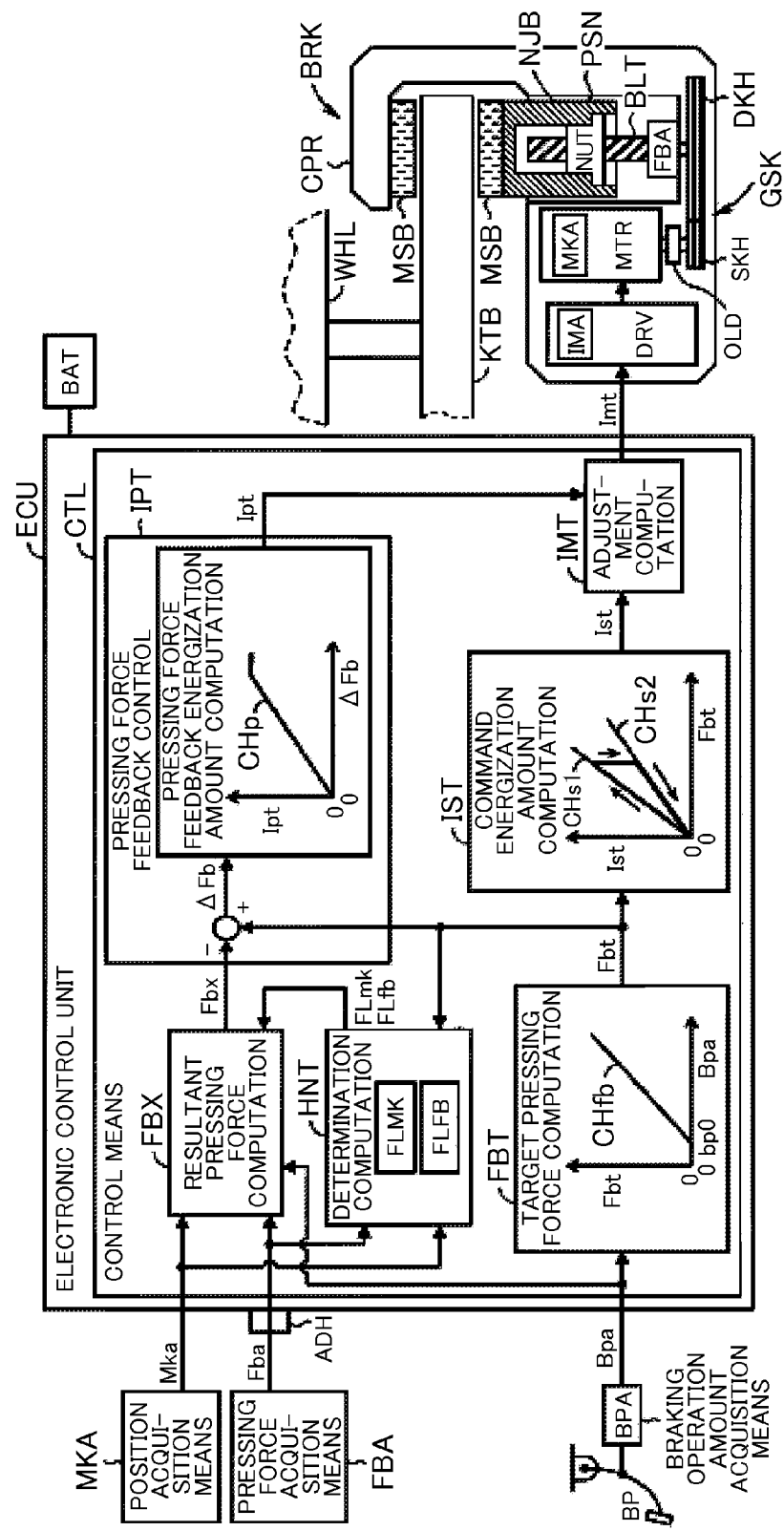
FIG. 1 is an overall configuration view of an electric braking system for a vehicle according to an embodiment of the invention.

Overall Configuration of Electric Braking System for Vehicle According to Embodiment of the Invention As shown in FIG. 1, a vehicle including the electric braking system includes a braking operation member BP, an electronic control unit ECU, braking means (brake actuator) BRK, pressing force acquisition means (pressing force sensor) FBA, position acquisition means (rotation angle sensor) MKA and a storage battery BAT.

The braking operation member (for example, a brake pedal) BP is a member that is operated by a driver to decelerate the vehicle. On the basis of the operation amount of the braking operation member BP, the braking means (brake actuator) BRK adjusts the braking torque of each wheel WHL, and a braking force is generated in each wheel WHL.

The braking operation member BP includes braking operation amount acquisition means BPA. A driver's operation amount (braking operation amount) Bpa of the braking operation member BP is acquired (detected) by the braking operation amount acquisition means BPA. A sensor (pressure sensor) that detects the pressure of a master cylinder (not shown) or a sensor (brake pedal depression force sensor or brake pedal stroke sensor) that detects an operation force on the braking operation member BP and/or a displacement of the braking operation member BP is employed as the braking operation amount acquisition means BPA. Therefore, the braking operation amount Bpa is computed on the basis of at least any one of a master cylinder pressure, a brake pedal depression force and a brake pedal stroke. The braking operation amount Bpa is input to the electronic control unit ECU. The braking operation amount Bpa may be computed or acquired in another electronic control unit (for example, an electronic control unit for steering control or an electronic control unit for powertrain control) and its computed value (signal) may be transmitted to the ECU via a communication bus.

The electronic control unit ECU has control means (control algorithm) CTL programmed therein to control the braking means BRK, and controls the BRK on the basis of the CTL. The storage battery (battery) BAT is a power supply that supplies electric power to the BRK, the ECU, and the like.

The position acquisition means (for example, an angle sensor) MKA detects a position (for example, rotation angle) Mka of the rotor (rotating element) of an electric motor MTR that is the power source of the BRK. The position acquisition means MKA is provided inside the electric motor MTR. The position Mka is input to the electronic control unit ECU (particularly, the control means CTL).

The pressing force acquisition means FBA acquires (detects) a reaction force (reaction) of a force (pressing force) Fba that a pressing member PSN presses friction members MSB. Specifically, in the pressing force acquisition means FBA, the pressing force Fba is detected on the basis of an electrical change (for example, a voltage change) due to a displacement (that is, a strain) that arises in the case of receiving a force, as in the case of a strain gauge. The pressing force acquisition means FBA is provided between a bolt member BLT and a caliper CPR. For example, the pressing force acquisition means FBA is fixed to the caliper CRP, and a force that the pressing member PSN receives from the friction members MSB is acquired as the pressing force Fba. The pressing force Fba is input to the electronic control unit ECU (particularly, the control means CTL) via analog-digital conversion means (AD conversion means) ADH. Although the detected signal of the FBA is an analog value, the detected signal of the FBA is converted to a digital value by the analog-digital conversion means ADH, and is input to the electronic control unit ECU. At this time, the resolution (least significant bit (LSB)) of the pressing force Fba is determined depending on the number of bits of the conversion means ADH.

Control Means CTL

The control means CTL is composed of a target pressing force computing block FBT, a command energization amount computing block IST, a resultant pressing force computing block FBX, a determination computing block HNT, a pressing force feedback control block IPT and an energization amount adjustment computing block IMT. The control means (control program) CTL is programmed in the electronic control unit ECU.

In the target pressing force computing block FBT, a target pressing force Fbt of each wheel WHL is computed on the basis of the braking operation amount Bpa and a preset target pressing force computing characteristic (computing map) CHfb. The target pressing force Fbt is a target value of the pressing force that is the force that the friction members (brake pads) MSB press the rotary member (brake disc) KTB in the electric braking means BRK.

In the command energization amount computing block IST, a command energization amount Ist is computed on the basis of preset command energization amount computing characteristics (computing maps) CHs1, CHs2 and the target pressing force Fbt. The command energization amount Ist is a target value of the energization amount of the electric motor MTR for achieving the target pressing force Fbt by driving the electric motor MTR of the electric braking means BRK. The computing map for Ist is composed of two characteristics CHs1, CHs2 in consideration of the hysteresis of the electric braking means BRK. The characteristic CHs1 corresponds to the case where the pressing force is increased. The characteristic CHs2 corresponds to the case where the pressing force is reduced. Therefore, in comparison with the characteristic CHs2, the characteristic CHs1 is set so as to output the relatively large command energization amount Ist.

The energization amount is a state quantity (variable) for controlling the output torque of the electric motor MTR. The electric motor MTR outputs a torque substantially proportional to a current, so a target current value of the electric motor MTR may be used as a target value of the energization amount. An increase in voltage supplied to the electric motor MTR results in an increase in current, so a supplied voltage value may be used as the target energization amount. In addition, the supplied voltage value may be adjusted by a duty ratio in pulse width modulation (PWM), so the duty ratio may be used as the energization amount.

In the resultant pressing force computing block FBX, a resultant pressing force Fbx is computed on the basis of the braking operation amount Bpa, the actual position Mka of the electric motor MTR and the actually generated pressing force (actual pressing force value) Fba. Specifically, an estimated pressing force value Fbe is computed on the basis of a rotor position (rotation angle) Mka of the electric motor, and the resultant pressing force Fbx is computed by taking contribution degrees (coefficients that determine the influence degrees) Ka1, Ke2 for the actual pressing force value Fba, acquired by the pressing force acquisition means FBA, and the estimated pressing force value Fbe. That is, the resultant pressing force Fbx corresponds to the force (pressing force) that the MSBs are pressed against the KTB, and is computed on the basis of the two different detected signals (Fba, Mka).

The estimated pressing force value Fbe is estimated on the basis of the rotor position Mka and the stiffness value Gcp of the braking means BRK (Fbe=Mka×Gcp). The contribution degree (first contribution degree) Ka1 for the actual pressing force value Fba and the contribution degree (second contribution degree) Ke2 for the estimated pressing force value Fbe are computed on the basis of the braking operation amount Bpa. The first and second contribution degrees Ka1, Ke2 are coefficients that determine the influence degrees (the degrees of contribution) of Fba, Fbe in computing the resultant pressing force Fbx. The first contribution degree Ka1 increases with an increase in the braking operation amount Bpa. The second contribution degree Ke2 decreases with an increase in Bpa. That is, in computing the resultant pressing force Fbx, the influence degree of the estimated pressing force value Fbe that is computed on the basis of the position Mka of the electric motor is higher than the influence degree of the actual pressing force value Fba in the case where the braking operation amount Bpa is small, and the influence degree of Fba is increased and the influence degree of Fbe is reduced as Bpa increases.

The determination computing block HNT is composed of a pressing force determination computing block (which corresponds to pressing force state determination means) FLFB and a position determination computing block (which corresponds to position state determination means) FLMK. In the determination computing block HNT, it is determined whether signals from the acquisition means (detecting means) are normal (appropriate).

In the pressing force determination computing block FLFB, it is determined whether an output signal (actual pressing force) Fba from the pressing force acquisition means FBA is normal (appropriate). That is, it is determined whether the pressing force acquisition means FBA is normal. When Fba is normal (when the FBA is normal), a control flag FLfb set to zero is output; whereas, when Fba is not normal (when the FBA is not normal), the control flag FLfb set to one is output. Determination in the FLFB is carried out on the basis of a deviation ΔFah between the target pressing force Fbt and the actual pressing force value Fba. When the deviation ΔFah is smaller than a predetermined value fah1, FLfb set to zero (normal determination result) is output. On the other hand, when the deviation ΔFah is larger than or equal to the predetermined value fah1, FLfb=1 (abnormal determination result) is output.

In the position determination computing block FLMK, it is determined whether an output signal (actual position) Mka from the position acquisition means MKA is normal (appropriate). That is, it is determined whether the position acquisition means IMA is normal. When Mka is normal (when the MKA is normal), a control flag FLmk set to zero is output; whereas, when Mka is not normal (when the MKA is not normal), the control flag FLmk set to one is output. Determination in the FLMK is carried out on the basis of a deviation ΔFeh between the target pressing force Fbt and the estimated pressing force value Fbe. When the deviation ΔFeh is smaller than a predetermined value feh1, FLmk set to 0 (normal determination result) is output. On the other hand, when the deviation ΔFeh is larger than or equal to the predetermined value feh1, FLmk set to 1 (abnormal determination result) is output.

In the resultant pressing force computing block FBX, the first and second contribution degrees Ka1, Ke2 may be adjusted on the basis of the control flags FLfb, FLmk from the determination computing block HNT. When FLfb set to 1 (the control flag in the case where Fba is not normal) is received, Ka1 is reduced, and Ke2 is increased. For example, Ka1 may be set to 0 and Ke2 may be set to 1. In this case, Fba is not used in computing Fbx, and Fbx is computed on the basis of only Fbe. When FLmk set to 1 (the control flag in the case where Mka is not normal) is received, Ka1 is increased, and Ke2 is reduced. For example, Ka1 may be set to 1 and Ke2 may be set to 0. In this case, Fbe is not used in computing Fbx, and Fbx is computed on the basis of only Fba.

In the pressing force feedback control block IPT, a pressing force feedback energization amount Ipt is computed on the basis of the target pressing force (target value) Fbt and the resultant pressing force Fbx. The command energization amount Ist is computed as a value corresponding to the target pressing force Fbt; however, there may arise an error (steady error) between the target pressing force Fbt and the pressing force Fbx due to fluctuations in the efficiency of the electric braking means BRK. The pressing force feedback energization amount Ipt is computed on the basis of the deviation (pressing force deviation) ΔFb between the target pressing force Fbt and the resultant pressing force Fbx and a preset computing characteristic (computing map) CHp, and is determined so as to reduce the above-described error. That is, on the basis of the computing map CHp, the pressing force feedback energization amount Ipt is computed so as to increase as the pressing force deviation ΔFb (=Fbt−Fbx) increases.

In the energization amount adjustment computing block IMT, a target energization amount Imt that is a final target value of the electric motor MTR is computed. The command energization amount Ist is adjusted by the use of the pressing force feedback energization amount Ipt, and the target energization amount Imt is computed. Specifically, the final target energization amount Imt is computed by adding the feedback energization amount Ipt to the command energization amount Ist. The rotation direction of the electric motor MTR (a forward direction in which the pressing force increases or a reverse direction in which the pressing force reduces) is determined on the basis of the sign of the target energization amount Imt (whether the value is positive or negative), and the output (rotational power) of the electric motor MTR is controlled on the basis of the magnitude (absolute value) of the target energization amount Imt.

Electric Braking Means BRK

In the electric braking system according to the embodiment of the invention, generation and adjustment of the braking torque of each wheel WHL of the vehicle are carried out by the electric motor MTR. The electric braking means (brake actuator) BRK is composed of the brake caliper (for example, a floating caliper) CPR, the rotary member (for example, a brake disc) KTB, the friction members (for example, brake pads) MSB, the electric motor MTR, driving means (an electrical circuit for driving the MTR) DRV, a coupling member (for example, an Oldham coupling) OLD, a speed reducer GSK, a rotational motion-linear motion converter (for example, a screw member) NJB, the pressing force acquisition means FBA, the position acquisition means MKA and energization amount acquisition means IMA.

The braking means BRK, as well as a known braking device, includes the known brake caliper CPR and the friction members MSB. A friction force is generated when the friction members MSB are pressed against the known rotary member KTB, a braking torque is applied to each wheel WHL, and a braking force is generated.

The brake caliper CPR is a floating caliper, and is configured to sandwich the rotary member (brake disc) KTB via the two friction members (brake pads) MSB. Inside the caliper CPR, the pressing member PSN is caused to slide and advance toward the rotary member KTB or recede from the rotary member KTB. The pressing member (brake piston) PSN generates a friction force by pressing the friction members MSB against the rotary member KTB.

Each of the friction members (for example, brake pads with a back plate) MSB is replaceable when abraded. Therefore, the MSBs and the PSN are not fixed to each other (not integrally bonded to each other). That is, the friction members (brake pads with a back plate) MSB and the pressing member (piston) PSN have separate structures. When the braking torque is increased, the MSBs advance toward the rotary member (brake disc) KTB as the pressing member PSN presses the back plate portion of one of the friction members MSB. When the braking torque is reduced, the MSBs recede from the KTB in the separating direction by the reaction force that is generated because of the overall stiffness of the BRK (the stiffness of the CPR and the stiffness of each MSB).

A brushed motor or a brushless motor is employed as the electric motor MTR. In the rotation direction of the electric motor MTR, the forward direction corresponds to the direction in which the pressing member PSN approaches the rotary member KTB (the direction in which the pressing force increases and the braking torque increases), and the reverse direction corresponds to the direction in which the pressing member PSN separates from the rotary member KTB (the direction in which the pressing force reduces and the braking torque reduces). The output of the electric motor MTR is determined on the basis of the target energization amount Imt that is computed by the control means CTL. Specifically, when the sign of the target energization amount Imt is positive (+: plus) (Imt>0), the electric motor MTR is driven in the forward direction; whereas, when the sign of Imt is negative (−: minus) (Imt<0), the electric motor MTR is driven in the reverse direction. The rotational power of the electric motor MTR is determined on the basis of the magnitude (absolute value) of the target energization amount Imt. That is, the output torque of the electric motor MTR increases as the absolute value of the target energization amount Imt increases, and the output torque reduces as the absolute value of the target energization amount Imt reduces.

In the driving means (which is an electrical circuit for driving the electric motor MTR, and is a driving circuit) DRV, an energization amount (eventually, a current value) to the electric motor MTR is controlled on the basis of the target energization amount (target value) Imt. Specifically, the driving means DRV is composed of a bridge circuit that uses a plurality of switching elements (power transistors, and, for example, MOS-FETs or IGBTs). Those elements are driven on the basis of the target energization amount Imt of the electric motor, and the output of the electric motor MTR is controlled. Specifically, the rotation direction and output torque of the electric motor MTR are adjusted by switching the switching elements between conductive and non-conductive states.

The output (rotational power) of the electric motor MTR is transmitted to the pressing member PSN in order of the coupling member OLD, the speed reducer GSK and the rotational motion-linear motion converter (screw member) NJB. The pressing member (brake piston) PSN is caused to advance toward the rotary member (brake disc) KTB or recede from the rotary member (brake disc) KTB. Thus, the force (pressing force) that the friction members (brake pads) MSB press the rotary member KTB is adjusted. Because the rotary member KTB is fixed to each wheel WHL, a friction force arises between the friction members MSB and the rotary member KTB, and a braking force arises in each wheel WHL.

The coupling member OLD is a shaft coupling for absorbing decentering (shaft imperfect alignment) between the rotary shaft (hereinafter, referred to as motor shaft) of the electric motor MTR and the rotary shaft (input shaft) of the speed reducer GSK, and, for example, an Oldham coupling is employed. In the Oldham coupling, decentering between the two shafts (the motor shaft and the input shaft) having different axes is absorbed by a slip of fitting between the protrusion (key) of a disc and the groove (key groove) of a slider, and rotational power (rotation motion) is transmitted.

The speed reducer GSK outputs the power of the electric motor MTR to the rotational motion-linear motion converter NJB (specifically, the bolt member BLT) after reducing the rotation speed. That is, the rotation output (torque) of the electric motor MTR is increased in response to the reduction ratio of the speed reducer GSK, and the rotation force (torque) of the bolt member BLT is obtained. For example, the speed reducer GSK is composed of a small-diameter gear SKH and a large-diameter gear DKH. Not only a gear transmission mechanism but also a winding transmission mechanism, such as a belt and a chain, or a friction transmission mechanism may be employed as the speed reducer GSK.

The rotational motion-linear motion converter NJB is a feed screw, and is composed of the bolt member BLT and a nut member NUT. The bolt member BLT is fixed to the output shaft (for example, the rotary shaft of the large-diameter gear DKH) of the speed reducer GSK. The rotational power of the bolt member BLT is converted to linear power (thrust) via the nut member NUT, and the linear power (thrust) is transmitted to the pressing member PSN.

When the screw member NJB is composed of a trapezoidal screw thread (a slide screw that transmits power by sliding), the nut member NUT has a female thread (internal thread), and the bolt member BLT has a male thread (external thread). The female thread of the nut member NUT and the male thread of the bolt member BLT are screwed to each other. The rotational power (torque) transmitted from the speed reducer GSK is transmitted via the screw member NJB (mutually screwed male thread and female thread) as the linear power (thrust) of the pressing member PSN.

Instead of the slide screw, a rolling screw (such as a ball screw) that transmits power by rolling may be employed as the screw member NJB. In this case, the nut member NUT and the bolt member BLT each have a thread groove (ball groove), and operates as a rotational motion-linear motion conversion mechanism when balls (steel balls) are fitted to the thread groove.

The driving circuit DRV of the electric motor includes energization amount acquisition means (for example, a current sensor) IMA that detects an actual energization amount (for example, a current that actually flows through the electric motor) Ima. The electric motor MTR includes position detection acquisition means (for example, an angle sensor) MKA that detects the actual position (for example, the rotation angle) Mka of the rotor (rotating element). In addition, in order to acquire (detect) the force (actual pressing force) Fba that the friction members MSB actually press the rotary member KTB, the pressing force acquisition means (for example, the pressing force sensor) FBA is provided. The pressing force acquisition means FBA is fixed to the caliper CRP, and the force that the pressing member PSN receives from the friction members MSB is acquired as the pressing force Fba.

In the above-described configuration, the pressing force acquisition means FBA directly acquires (detects) the pressing force Fba. The specifications of the braking means BRK (for example, the gear ratio of the GSK, the lead of the NJB, and the like) are known, so the FBA may acquire a force-related state quantity of any movable member in a power transmission path from the electric motor MTR to the friction members MSB as the actual pressing force value (actual pressing force) Fba. Specifically, the above-described force-related state quantity is at least one of the output torque of the electric motor MTR, the output torque of the GSK, the thrust of the NJB, the thrust of the PSN and the pressing force of the MSBs. The actual pressing force value Fba may be indirectly acquired (computed) on the basis of the state quantity (single or multiple state quantities) and the specifications of the BRK.

Similarly, because the specifications of the braking means BRK are known, the position acquisition means MKA may acquire a position-related state quantity of any movable member in the power transmission path from the electric motor MTR to the friction members MSB as the position (actual position) Mka. Specifically, the above-described position-related state quantity is at least one of the position of the electric motor MTR, the position of the GSK, the position of the NJB, the position of the PSN and the position of the MSBs. The position Mka may be indirectly acquired (computed) on the basis of the state quantity (single or multiple state quantities) and the specifications of the BRK (the gear ratio of the GSK, the lead of the NJB, and the like). That is, the MKA may not only directly acquire the position Mka of the electric motor but also may indirectly obtain the position Mka of the electric motor.

The configuration of a so-called disc braking system (disc brake) is illustrated as the electric braking means BRK; instead, the BRK may be a drum braking system (drum brake). In the case of the drum brake, the friction members MSB are brake shoes, and the rotary member KTB is a brake drum. Similarly, the force (pressing force) that the brake shoes press the brake drum is controlled by the electric motor MTR. The one that generates a torque through rotational motion is illustrated as the electric motor MTR; instead, a linear motor that generates a force through linear motion may be employed.

In the above configured braking means BRK, at the time when the pressing force is reduced, there is a section (ineffective displacement section) in which the pressing force does not reduce while the position of the electric motor changes. The ineffective displacement is due to clearances (rattles) in the power transmission members (the coupling member OLD, the speed reducer GSK, and the like) from the electric motor MTR to the pressing force acquisition means FBA. Specifically, the ineffective displacement arises as a result of a change of a portion (pressure receiving face) that receives the reaction of the pressing force due to the clearances in the power transmission members. In the coupling member (Oldham coupling), there is a clearance between the key (protrusion) and the key groove (recess), and there is a backlash of the speed reducer (speed reduction gear). One of the faces (the faces of the key and key groove of the Oldham coupling, the tooth flanks of the speed reduction gear) contacts when receiving the reaction of the pressing force, and the other one of the faces, opposite to the one of the faces (a face different from one of the contact faces), contacts when the friction loss (torque loss) of the electric motor MTR is cancelled out. The displacement (a change in position) of the electric motor, corresponding to the clearances in which the contact face switches corresponds to the ineffective displacement.

Resultant Pressing Force Computing Block FBX

Figure 2:
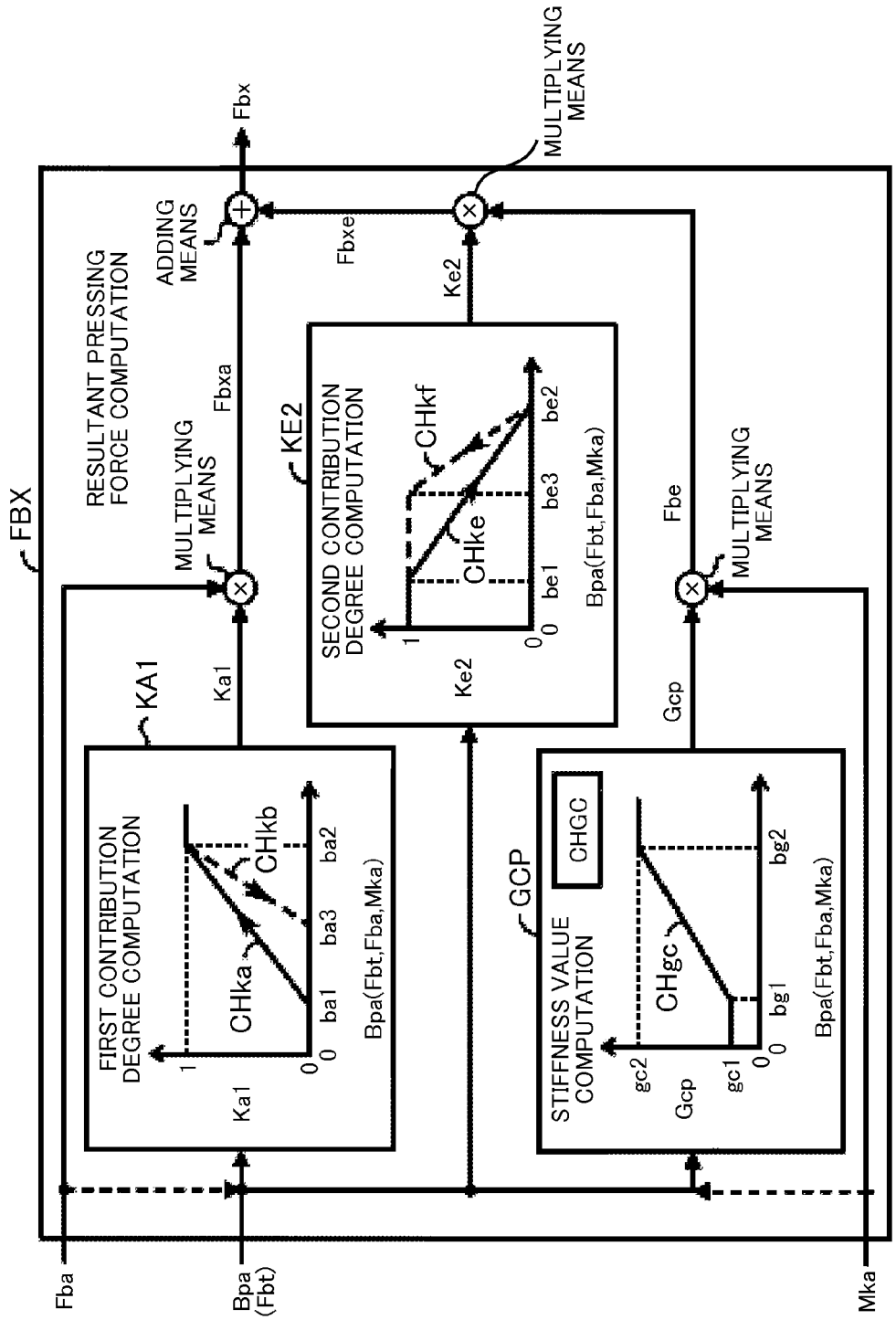
FIG. 2 is a functional block diagram for illustrating a resultant pressing force computing block shown in FIG. 1.

Next, an embodiment of the resultant pressing force computing block FBX will be described with reference to FIG. 2. The resultant pressing force computing block FBX is composed of a first contribution degree computing block KA1, a second contribution degree computing block KE2 and a stiffness value computing block GCP.

In the first contribution degree computing block KA1, the first contribution degree Ka1 is computed on the basis of the braking operation amount Bpa. The first contribution degree Ka1 is a coefficient that determines the influence degree of the actual pressing force value Fba in computing the resultant pressing force Fbx. The first contribution degree Ka1 is computed on the basis of the braking operation amount Bpa and the computing characteristic (computing map) CHka. When Bpa is smaller than a predetermined value ba1, Ka1 is computed to zero; whereas, when Bpa is larger than or equal to the predetermined value ba1 and is smaller than a predetermined value ba2 (>ba1), Ka1 is increased (monotonously increased) with an increase in Bpa from zero to one. When Bpa is larger than or equal to the predetermined value ba2, Ka1 is computed to one. When Ka1=0, Fba is not used in computing Fbx.

In the second contribution degree computing block KE2, the second contribution degree Ke2 is computed on the basis of the braking operation amount Bpa. The second contribution degree Ke2 is a coefficient that determines the influence degree of the estimated pressing force value Fbe (pressing force that is estimated on the basis of Mka) in computing the resultant pressing force Fbx. The second contribution degree Ke2 is computed on the basis of the braking operation amount Bpa and the computing characteristic (computing map) CHke. When Bpa is smaller than a predetermined value be1, Ke2 is computed to one; whereas, when Bpa is larger than or equal to the predetermined value be1 and is smaller than a predetermined value be2 (>be1), Ke2 is reduced (monotonously reduced) from one to zero with an increase in Bpa. When Bpa is larger than or equal to the predetermined value be2, Ke2 is computed to zero. When Ke2=0, Fbe is not used in computing Fbx.

In the stiffness value computing block GCP, a stiffness value Gcp is computed on the basis of the braking operation amount Bpa. The stiffness value Gcp corresponds to the stiffness (spring constant) of the overall braking means. That is, Gcp indicates the spring constant of series-connected springs of the caliper CPR and the friction members MSB. The stiffness value (estimated value) Gcp is computed on the basis of the braking operation amount Bpa and a stiffness characteristic (computing map) CHgc. CHgc is a characteristic for estimating the stiffness value Gcp on the basis of Bpa. When Bpa is smaller than a predetermined value bg1, Gcp is computed as a predetermined value gc1; whereas, when Bpa is larger than or equal to the predetermined value bg1 and is smaller than a predetermined value bg2 (>bg1), Gcp is increased (monotonously increased) from the predetermined value gc1 to a predetermined value gc2 (>gc1) with an increase in Bpa. When Bpa is larger than or equal to the predetermined value bg2, Gcp is computed as the predetermined value gc2.

The estimated pressing force value Fbe is computed on the basis of the stiffness value Gcp and the position Mka of the electric motor MTR. The estimated pressing force value Fbe is a pressing force that is estimated from Mka. Specifically, the estimated pressing force value Fbe is computed by multiplying the stiffness value Gcp, indicating the spring constant of the overall braking means, by the actual position (rotation angle) Mka of the electric motor MTR.

An actual value component Fbxa that is an Fba component in the resultant pressing force Fbx is computed on the basis of the actual pressing force value (actual pressing force) Fba and the first contribution degree Ka1. Fbxa is a component of the actual pressing force value Fba in consideration of the influence degree by the use of Ka1. Specifically, Fbxa is determined by multiplying the actual pressing force value Fba by the coefficient Ka1 (that is, Fbxa=Ka1×Fba). An estimated value component Fbxe that is an Fbe component in the resultant pressing force Fbx is computed on the basis of the estimated pressing force value (pressing force estimated on the basis of Mka) Fbe and the second contribution degree Ke2. Fbxe is a component of the estimated pressing force value Fbe in consideration of the influence degree by the use of Ke2. Specifically, Fbxe is determined by multiplying the estimated pressing force value Fbe by the coefficient Ke2 (that is, Fbxe=Ke2× Fbe=Ke2×Gcp×Mka). The resultant pressing force Fbx is computed by adding the component (actual value component) Fbxa for the actual pressing force value and the component (estimated value component) Fbxe for the estimated pressing force value together (that is, Fbx=Fbxa+ Fbxe=Ka1×Fba+Ke2×Fbe). Therefore, the resultant pressing force Fbx is a pressing force that takes the influence degrees of Fba and Fbe in consideration in response to the magnitude of Bpa.

The actual pressing force Fba is detected by an element (strain detection element) that detects a strain (deformation in the case where a force is exerted). Generally, an analog signal is transmitted from the strain detection element, the analog signal is analog-to-digital converted (AD converted), and is then taken into the electronic control unit ECU. Because Fba is input to the ECU via the analog-digital conversion means ADH, the resolution of detection of the pressing force depends on the performance (resolution) of AD conversion. On the other hand, the actual position (rotation angle) of the electric motor is taken into the ECU as a digital signal from a Hall IC or a resolver. In addition, the output of the electric motor is reduced in speed by the GSK, and the like, and is converted to the pressing force. Therefore, the estimated pressing force value Fbe that is computed from the electric motor position Mka that is acquired by the position acquisition means MKA has a higher resolution of the pressing force than the actual pressing force value Fba that is acquired by the pressing force acquisition means FBA. On the other hand, the estimated pressing force value Fbe is computed on the basis of the stiffness (spring constant) Gcp of the BRK. Because the stiffness value Gcp fluctuates with an abrasion state of each friction member MSB, the actual pressing force value Fba has a higher reliability (a smaller error from a true value) than the estimated pressing force value Fbe.

Figure 7:
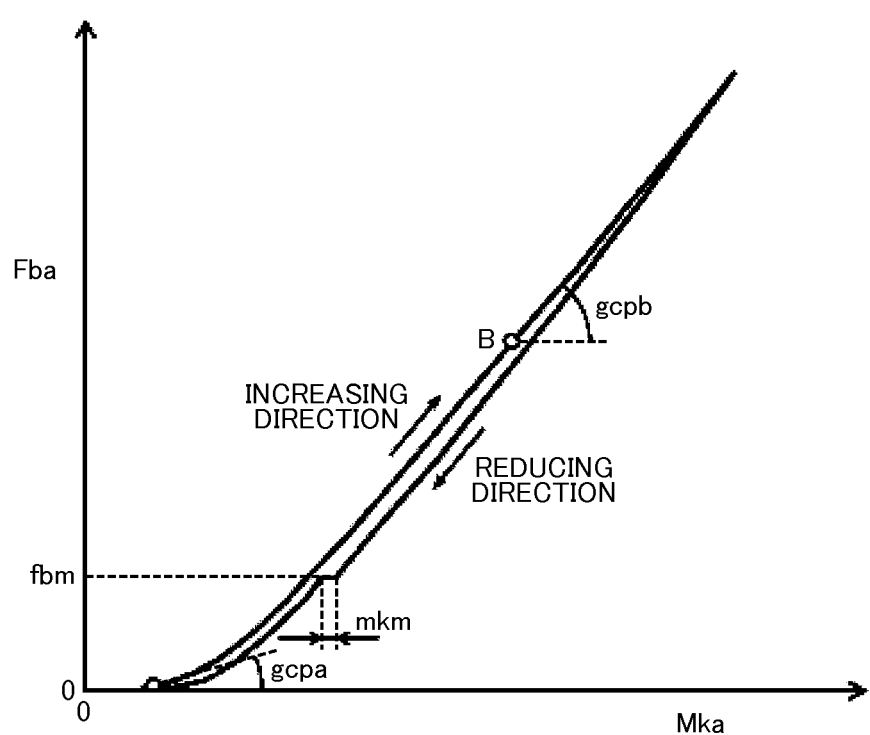
FIG. 7 is a graph that shows the characteristic of the stiffness of overall braking means (brake actuator).

The characteristic of the pressing force Fba to the electric motor position Mka (that is, a change in the spring constant of the overall braking system) is nonlinear, and has a downward convex shape (see FIG. 7). Therefore, in a region in which the pressing force Fba is large, because the detection sensitivity of the pressing force Fba (a variation in pressing force to a displacement) is sufficiently high, the actual pressing force value Fba is usable for the pressing force feedback control. However, in a region in which the pressing force is small, because the detection sensitivity of the actual pressing force value Fba is low, the estimated pressing force value Fbe is desirably employed for the pressing force feedback control in addition to (or instead of) the actual pressing force value Fba.

From the above-described knowledge, when the braking operation amount Bpa is small, the first contribution degree Ka1 is computed to a relatively small value, and the second contribution degree Ke2 is computed to a relatively large value. As a result, in the region in which the pressing force is small (that is, the region in which the braking operation amount is small and the braking torque is small), which requires minute adjustment of the braking torque, the resolution of detecting a generated pressing force (least significant bit (LSB)) is improved, and precise pressing force feedback control can be executed. When the braking operation amount Bpa is large, Ka1 is computed to a relatively large value, Ke2 is computed to a relatively small value, the influence degree of the estimated pressing force value Fbe estimated from Mka is reduced, and the influence degree of the actually detected actual pressing force value Fba is increased. As a result, in the region in which the pressing force is large (that is, the braking operation amount is large and the braking torque is large), which requires that the correlation of the vehicle deceleration to the braking operation amount Bpa be constant, the pressing force feedback control having a high reliability (that is, based on the pressing force having a small error from a true value) can be executed.

In addition, when the braking operation amount Bpa is smaller than the predetermined operation amount (predetermined value) ba1, the first contribution degree Ka1 may be set to zero. When the braking operation amount Bpa is larger than the predetermined operation amount (predetermined value) be2 (>ba1), the second contribution degree Ke2 may be set to zero. Therefore, the resolution of the pressing force feedback control in the region in which Bpa is small (the braking torque is small) can be improved, and the reliability of the pressing force feedback control in the region in which Bpa is large (the braking torque is large) can be improved.

In the computing characteristics CHka, CHke of the first and second contribution degrees Ka1, Ke2, instead of the braking operation amount Bpa (X-axis variable), at least one of the target pressing force Fbt, the actual pressing force value Fba and the actual position Mka (that is, a value corresponding to the braking operation amount) is used. This is because Fbt is computed on the basis of Bpa and the control results are Fba and Mka.

The computing characteristics CHka, CHke may be set such that the predetermined values ba1, be1 are equal to each other and the predetermined values ba2, be2 are equal to equal other. In this case, any one of the first contribution degree computing block KA1 and the second contribution degree computing block KE2 may be omitted. When the first contribution degree computing block KA1 is omitted, the resultant pressing force Fbx is computed by using the second contribution degree Ke2 on the basis of Fbx=(1−Ke2)×Fba+Ke2×Fbe. When the second contribution degree computing block KE2 is omitted, the resultant pressing force Fbx is computed by using the first contribution degree Ka1 on the basis of Fbx=Ka1×Fba+(1−Ka1)×Fbe. The estimated pressing force value Fbe is computed on the basis of the stiffness value Gcp and the electric motor position Mka (that is, Fbe=Gcp×Mka).

In addition, in the computing characteristics of the first and second contribution degrees Ka1, Ke2, the characteristics CHka, CHke (indicated by the continuous lines in KA1, KE2) in the case where Bpa increases and the characteristics CHkb, CHkf (indicated by the broken lines in KA1, KE2) in the case where Bpa reduces may be separately set. In the computing characteristic of the first contribution degree Ka1, the computing characteristic CHka in the case where Bpa increases may be set so as to be larger than the computing characteristic CHkb in the case where Bpa reduces. In the computing characteristic of the second contribution degree Ke2, the computing characteristic CHke in the case where Bpa increases may be set so as to be smaller than the computing characteristic CHkf in the case where Bpa reduces.

In the first contribution degree computing block KA1, the computing characteristic CHka in the case where Bpa increases and the computing characteristic CHkb in the case where Bpa reduces are separately set, and CHkb is set so as to have a relatively smaller characteristic than CHka. In CHka, Ka1 is set to zero when Bpa is larger than or equal to zero and is smaller than the predetermined value ba1, Ka1 is set so as to monotonously increase with an increase in Bpa when Bpa is larger than or equal to the predetermined value ba1 and is smaller than the predetermined value ba2 (a value larger than ba1), and Ka1 is set to one when Bpa is larger than or equal to the predetermined value ba2. In CHkb, Ka1 is set to one when Bpa is larger than or equal to the predetermined value ba2, Ka1 is set so as to monotonously reduce with a reduction in Bpa when Bpa is larger than or equal to the predetermined value ba3 and is smaller than the predetermined value ba2, and Ka1 is set to zero when Bpa is larger than or equal to zero and is smaller than a predetermined value ba3. The predetermined value ba3 is a value larger than the predetermined value ba1 and smaller than the predetermined value ba2. For example, in the region in which Bpa is larger than ba1 and is smaller than ba3, Ka1 is computed to a value larger than zero at the time when Bpa is increased, and Ka1 is computed to zero at the time when Bpa is reduced.

Similarly, in the second contribution degree computing block KE2, the computing characteristic CHke in the case where Bpa increases and the computing characteristic CHkf in the case where Bpa reduces are separately set, and CHkf is set so as to have a relatively larger characteristic than CHke. In CHke, Ke2 is set to one when Bpa is larger than or equal to zero and is smaller than the predetermined value be1, Ke2 is monotonously reduced with an increase in Bpa when Bpa is larger than or equal to the predetermined value be1 and is smaller than the predetermined value be2 (a value larger than be1), and Ke2 is set to zero when Bpa is larger than or equal to the predetermined value be2. In CHkf, Ke2 is set to zero when Bpa is larger than or equal to the predetermined value be2, Ke2 is set so as to monotonously increase with a reduction in Bpa when Bpa is larger than or equal to the predetermined value be3 and is smaller than the predetermined value be2, and Ke2 is set to one when Bpa is larger than or equal to zero and is smaller than a predetermined value be3. The predetermined value be3 is a value larger than the predetermined value be1 and smaller than the predetermined value be2. For example, in the region in which Bpa is larger than be1 and is smaller than be3, Ke2 is computed to a value smaller than one at the time when Bpa is increased, and Ke2 is computed to one at the time when Bpa is reduced.

The first and second contribution degree computing blocks KA1, KE2 respectively set the predetermined values ba3, be3 to values larger than a value fbm corresponding to the friction loss of the electric motor, and the like. The predetermined values ba1, be1 may be respectively set to values smaller than the value fbm. Because the values ba3, be3 are set to values larger than the friction loss corresponding value fbm, Fba is not used in computing Fbx before Bpa reaches fbm when Bpa is reduced. Therefore, Fbx is computed on the basis of only Fbe. As a result, fluctuations in energization amount due to the ineffective displacement can be prevented. In addition, because no influence of the ineffective displacement arises when Bpa is increased, the values ba1, be1 can be set irrespective of the friction loss corresponding value fbm, so the resolution of the pressing force can be ensured in the region in which Bpa is small. The value fbm is computed as the same physical quantity as the pressing force; however, the value fbm is converted to the same physical quantity as a value corresponding to Bpa on the basis of the specifications (the reduction ratio, the lead, and the like) of the braking means, and ba3 and be3 are determined.

In addition, the value fbm corresponding to the friction loss of the electric motor is computed on the basis of the characteristic (the relationship between Mka and Fba) in the case where the braking operation amount Bpa is reduced, and may be variable. The values ba3, be3 may be determined on the basis of the computed (learned) value fbm. Specifically, when the braking operation amount Bpa is reduced, time-series data of the electric motor position Mka and actual pressing force value Fba are stored. On the basis of the stored time-series data, a region in which Fba does not change (reduce) although Mka changes (reduces) is extracted, and the value fbm is computed on the basis of Fba in this region. The values ba3, be3 may be computed by adding a predetermined value fbo (a positive value) to the value fbm. The friction loss of the electric motor, and the like, fluctuates with aged deterioration; however, the value fbm corresponding to the friction loss is learned at the time when the driver carries out braking operation, appropriate pressing force feedback control can be executed.

In the computing characteristics CHka, CHkb, CHke, CHkf of the first and second contribution degrees Ka1, Ke2, instead of the braking operation amount Bpa (X-axis variable), at least one of the target pressing force Fbt, the actual pressing force value Fba and the actual position Mka (that is, a value corresponding to the braking operation amount) is used. This is because Fbt is computed on the basis of Bpa and the control results are Fba and Mka. The predetermined value be3 may be set so as to be equal to the predetermined value ba3.

In the computing characteristics CHka, CHkb, CHke, CHkf, the predetermined values ba1, be1 may be set so as to be equal to each other, the predetermined values ba2, be2 may be set so as to be equal to each other, and the predetermined values ba3, be3 may be set so as to be equal to each other. In this case, any one of the first contribution degree computing block KA1 and the second contribution degree computing block KE2 may be omitted. When the first contribution degree computing block KA1 is omitted, the resultant pressing force Fbx is computed by using the second contribution degree Ke2 on the basis of Fbx=(1−Ke2)×Fba+Ke2×Fbe. When the second contribution degree computing block KE2 is omitted, the resultant pressing force Fbx is computed by using the first contribution degree Ka1 on the basis of Fbx=Ka1×Fba+(1−Ka1)×Fbe. The estimated pressing force value Fbe is computed on the basis of the stiffness value Gcp and the electric motor position Mka (that is, Fbe=Gcp×Mka).

Stiffness Characteristic Computing Block CHGC

Figure 3:
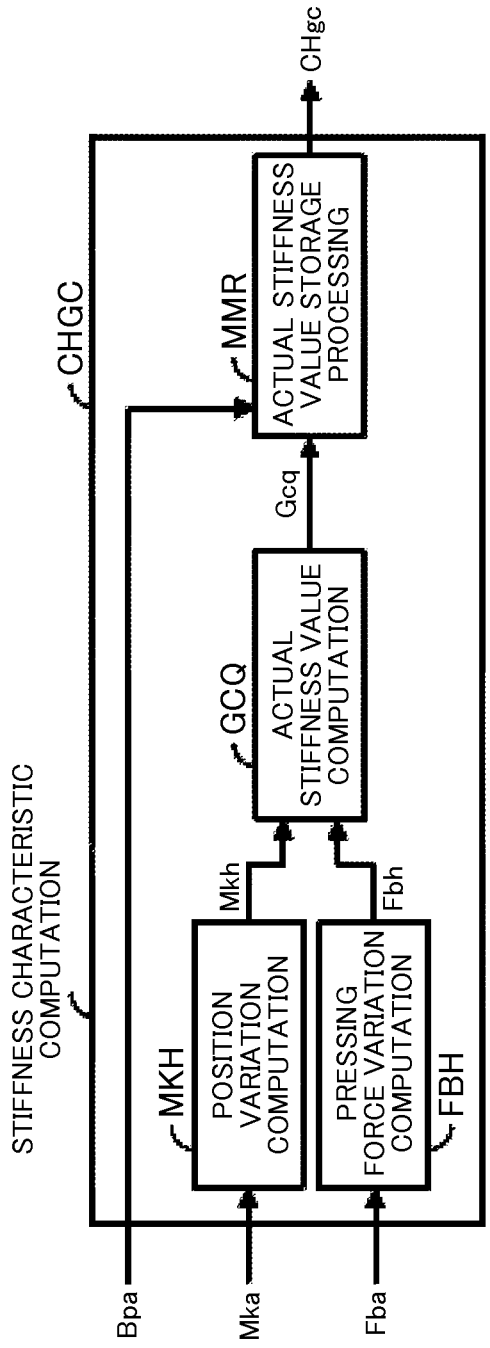
FIG. 3 is a functional block diagram for illustrating a stiffness characteristic computing block shown in FIG. 2.

The stiffness value computing block GCP includes a stiffness characteristic computing block CHGC, and a stiffness computing characteristic (computing map) CHgc may be learned in the stiffness characteristic computing block CHGC. An embodiment of the stiffness characteristic computing block CHGC will be described with reference to the functional block diagram shown in FIG. 3. The stiffness computing characteristic CHgc is a computing map for computing the stiffness value (estimated value) Gcp on the basis of the electric motor position Mka. The stiffness characteristic computing block CHGC is composed of a position variation computing block MKH, a pressing force variation computing block FBH, an actual stiffness value computing block GCQ and an actual stiffness value storage processing block MMR.

In the position variation computing block MKH, a position variation Mkh is computed on the basis of the actual position Mka of the electric motor. Specifically, a previous value mka[k] of Mka is stored, the previous value is compared with a present value mka[g] of Mka, and the deviation is computed as the position variation Mkh. That is, the position variation Mkh is computed in accordance with Mkh=mka[k]−mka[g]. The previous value mka[k] is a value a predetermined time (predetermined value) th0 before the present value mka[g]. That is, in computation periods, a predetermined period (fixed value) has elapsed from the previous value mka[k] to the present value mka[g].

In the pressing force variation computing block FBH, a pressing force variation Fbh is computed on the basis of the actual pressing force value Fba. Specifically, in each computation period, the previous value fba[k] of Fba, corresponding to the previous value mka[k] of Mka, is compared with the present value fba[g] of Fba, corresponding to the present value mka[g] of Mka, and the deviation is computed as the pressing force variation Fbh. That is, the pressing force variation Fbh is computed in accordance with Fbh=fba

[k]−fba[g]. mka[k] and fba[k] are values in the same computation period, and mka[g] and fba[g] are values in the same computation period.

In the actual stiffness value computing block GCQ, an actual stiffness value (which corresponds to an actual stiffness value) Gcq is computed on the basis of the position variation Mkh and the pressing force variation Fbh. Specifically, the pressing force variation Fbh to the position variation Mkh is computed as the actual stiffness value Gcq (=Fbh/Mkh). The actual stiffness value (actual value) Gcq is a value that corresponds to the spring constant of series-connected springs of the caliper CPR and the friction members MSB. Therefore, the actual stiffness value Gcq is computed by dividing the pressing force variation (for example, a temporal variation in pressing force) Fbh by the position variation (for example, a temporal variation in position) Mkh. Because the actual stiffness value Gcq is computed on the basis of Mkh and Fbh, the influence of an error of Fba (the zero-point drift of the FBA) can be compensated.

In the actual stiffness value storage processing block MMR, the characteristic of Gcq to Bpa is continuously stored on the basis of the braking operation amount Bpa and the actual stiffness value Gcq. That is, the actual stiffness value Gcq is sequentially stored in association with the braking operation amount Bpa, and the stored characteristic is output as the stiffness computing characteristic CHgc. The stiffness value Gcp is estimated on the basis of CHgc. In other words, the actual stiffness value (actual stiffness value) Gcq is stored to form the characteristic CHgc, and the stiffness value Gcp is estimated on the basis of CHgc.

The stiffness computing characteristic CHgc may be learned (stored) each time the driver carries out braking operation. At this time, when the temporal variation dBpa in Bpa is higher than or equal to a predetermined value dbpx, CHgc is not stored, and CHgc may be learned when dBpa is lower than the predetermined value dbpx. This is because, during rapid braking (when dBpa is high), a phase difference between Bpa and each of Mka and Fba (that is, a temporal delay in computed result Gcq from Bpa) becomes excessive. CHgc in the case where the electric motor position (rotation angle) Mka increases is not employed, and CHgc in the case where Mka reduces (when the MTR rotates in the reverse direction) may be employed. At this time, a limitation may be set on a temporal variation in Mka (that is, the speed of the electric motor), and the MTR may be gently rotated in the reverse direction. Thus, the influence of the above-described phase difference may be compensated.

Instead of the braking operation amount Bpa, at least one of the target pressing force Fbt, the actual pressing force value Fba or the actual position Mka (that is, a value corresponding to the braking operation amount) is used. In this case, the relationship of the actual stiffness value Gcq with respect to at least one of the employed Fbt, Fba and Mka is stored as the stiffness computing characteristic CHgc. When at least one of Fba and Mka is employed, the influence of the above-described phase difference may not arise.

In the stiffness value computing block GCP, the value fbm corresponding to the above-described torque loss of the electric motor, and the like, may be computed. When the braking operation amount Bpa is reduced, the actual stiffness value Gcq is computed on the basis of the position variation Mkh and the pressing force variation Fbh, and, after Gcp reduces to substantially zero, the value fbm may be computed on the basis of the actual pressing force value Fba at time at which Gcp increases again. Specifically, after Gcp reduces and becomes lower than a predetermined value gcpy, the value fbm is determined on the basis of the actual pressing force value at time at which Gcp becomes higher than or equal to a predetermined value gcpz (a value higher than gcpy). At this time, the value fbm is computed as the same physical quantity as the pressing force; however, the value fbm is converted to the same physical quantity as a value corresponding to Bpa on the basis of the specifications (the reduction ratio, the lead, and the like) of the braking means.

Oldham Coupling OLD

Figure 4:
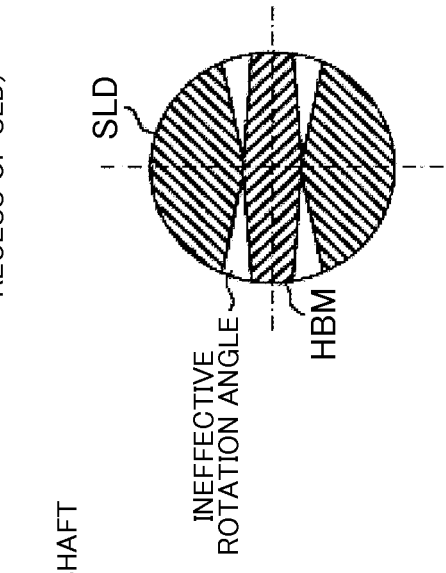
FIG. 4 is a schematic configuration view of an Oldham coupling.
Figure 4:
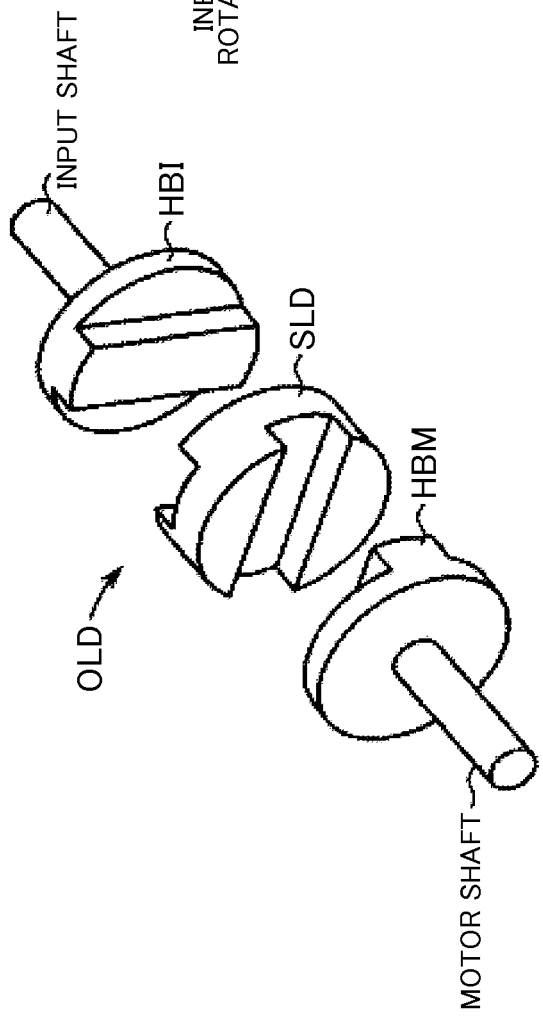

Next, the Oldham coupling OLD will be described with reference to FIG. 4. The Oldham coupling OLD is a coupling that transmits rotational power while allowing fitting of a protrusion (key) of a disc with a groove (key groove) of a slider to slide. The Oldham coupling OLD is composed of an input disc HBM, a slider (intermediate disc) SLD and an output disc HBI. As the protrusions of the discs HBM, HBI slide along the grooves of the slider SLD, decentering of the two shafts (the motor shaft and the input shaft) having different axes is absorbed, and the rotational power (rotational motion) is transmitted.

As shown in FIG. 4(a), the input disc HBM is fixed to the output shaft (motor shaft) of the electric motor MTR. The key (protrusion) is provided on the face across from the face of the input disc HBM, to which the motor shaft is fixed. A key groove (dent) is provided in the slider SLD so as to be in mesh with the key of the input disc HBM. Another key groove is provided on the face across from the side of the slider SLD, on which the key groove is provided, so as to be perpendicular to the key groove. A key (protrusion) is provided in the output disc HBI so as to be in mesh with the key groove (dent) of the slider SLD, and the output disc HBI is fixed to the shaft (input shaft) of the speed reducer GSK (small-diameter gear SKH) on the face on the back side of the face having the key. That is, the HBM, the SLD and the HBI are meshed with each other such that the protrusion of the input disc HBM is perpendicular to the protrusion of the output disc HBI. In the Oldham coupling OLD, decentering between the output shaft (motor shaft) of the electric motor MTR and the input shaft of the speed reducer is absorbed by a slide of the keys of the HBM and HBI along the corresponding key grooves of the slider SLD.

When a relatively large torque is exerted on the Oldham coupling OLD, the keys of the HBM and HBI and the key grooves of the SLD may deform or abrade and a backlash (clearances between contact faces of mechanical elements in the direction of motion) may increase. FIG. 4(b) is a cross-sectional view of a fitting portion at which the input disc HBM and the slider SLD are fitted. When there is no abrasion, or the like, the key and the key groove are fitted to each other with a slight clearance. However, when the clearance increases because of abrasion, or the like, there arises an ineffective displacement (ineffective rotation angle) that the input shaft of the GSK is not rotated even when the motor output shaft rotates in the rotation direction of the Oldham coupling OLD. The ineffective displacement in the Oldham coupling OLD is one of causes (another cause is a backlash of the GSK) due to which the state where Fba is not reduced even when Mka is reduced in the case where the pressing force (that is, braking torque) is reduced.

Operation and Advantageous Effect

Hereinafter, the operation and advantageous effect of the resultant pressing force computing block FBX will be described with reference to FIG. 5 and FIG. 6.

When Braking Torque is Increased

Figure 5:
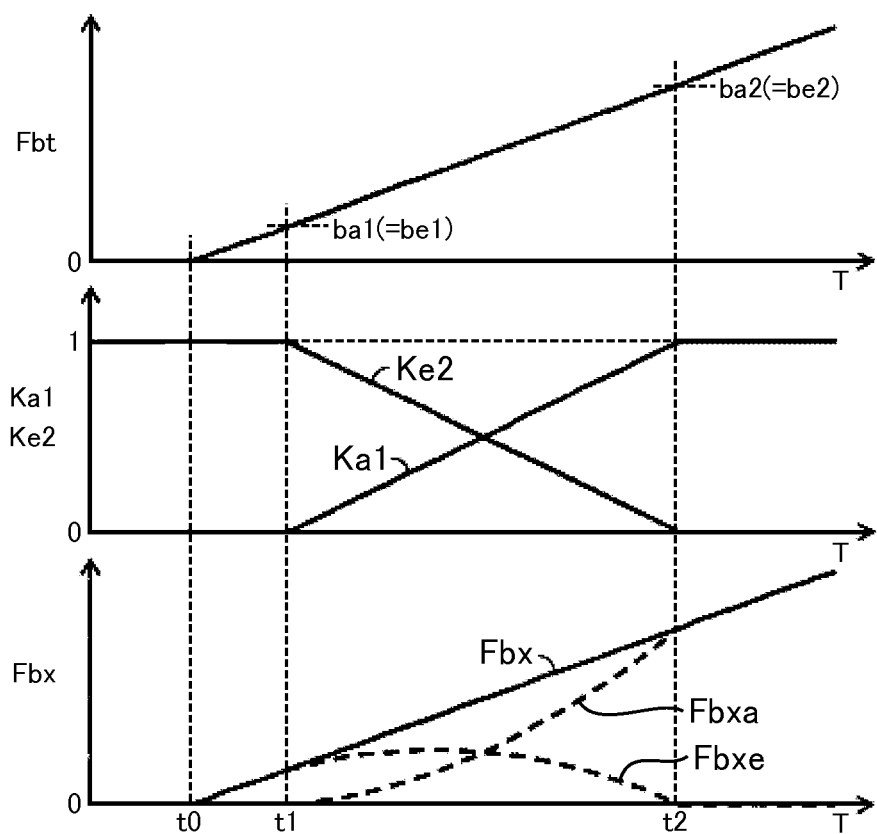
FIG. 5 is a time chart that shows an example of computation of a resultant pressing force in the case where a braking operation amount is increased.

FIG. 5 is a time-series chart in the case where the braking operation amount Bpa is increased from zero (not braking) and a braking torque that is applied to each wheel WHL is increased. To determine the first and second contribution degrees Ka1, Ke2, the case where Fbt is employed as a value corresponding to Bpa, the predetermined value ba1 is set so as to be equal to the predetermined value be1 and the predetermined value ba2 (>ba1) is set so as to be equal to the predetermined value be2 (>be2) is illustrated (see FIG. 2). Instead of Fbt, at least one of Bpa, Fba and Mka may be employed, and the respective predetermined values may have such a relationship that ba1≠be1 and/or ba2≠be2.

At time t0, the driver starts operating the braking operation member BP, and the target pressing force Fbt is gradually increased with an increase in Bpa. When Fbt is small (that is, a value corresponding to Bpa is small), the first contribution degree Ka1 is computed to a relatively small value, and the second contribution degree Ke2 is computed to a relatively large value. Ka1 is increased with an increase in Fbt. At this time, Ke2 may be reduced with an increase in Fbt.

For example, under the condition that Fbt≤ba1 (=be1), Ka1 is computed to zero and Ke2 is computed to one. At time t1, when Fbt exceeds the predetermined value ba1, Ka1 is increased from zero, and Ke2 is reduced from one. At time t2, when the condition that Fbt≥ba2 is satisfied, Ka1 is computed to one and Ke2 is computed to zero.

The actual pressing force value component Fbxa of the resultant pressing force Fbx is computed by multiplying the pressing force (actual pressing force value) Fba, actually acquired by the pressing force acquisition means FBA, by the coefficient Ka1. The estimated pressing force value component Fbxe of the resultant pressing force Fbx is computed by multiplying the estimated pressing force value Fbe, computed on the basis of the actual position (rotation angle of the rotor) Mka of the electric motor MTR, by the coefficient Ke2. Fbe is computed on the basis of Mka and the stiffness value (estimated value) Gcp of the BRK. The resultant pressing force Fbx is computed by adding Fbxa and Fbxe together.

Therefore, when the value corresponding to the braking operation amount Bpa (Bpa corresponding value) is the predetermined value ba1, the resultant pressing force Fbx is computed on the basis of only the electric motor position Mka. When the Bpa corresponding value is larger than the predetermined value ba1 and smaller than the predetermined value ba2, the resultant pressing force Fbx is computed on the basis of the actual pressing force value Fba and the estimated pressing force value Fbe (that is, the electric motor position Mka). When the Bpa corresponding value is larger than or equal to the predetermined value ba2, the resultant pressing force Fbx is computed on the basis of only the actual pressing force value Fba. The value corresponding to the braking operation amount Bpa (Bpa corresponding value) is computed on the basis of at least one of the braking operation amount Bpa, the target pressing force Fbt, the actual pressing force value Fba and the electric motor position Mka.

An actual change in the spring constant of the overall braking system (that is, a change in Fba to Mka) is nonlinear, and has a downward convex shape (see FIG. 7). Therefore, in a region in which the pressing force Fba is large, a change in pressing force Fba with respect to a change in position Mka is large. In the pressing force feedback control, the condition of the sensitivity of detecting Fba is satisfied. On the other hand, in the region in which the pressing force Fba is small, a change in Fba is small with respect to a change in Mka, and, in the pressing force feedback control, the sensitivity of detecting Fba is insufficient.

The actual pressing force Fba is output as an analog signal, the analog signal is analog-to-digital converted (AD converted), and is then input to the electronic control unit ECU. Therefore, the resolution of Fba is limited by the resolution of AD conversion (for example, 10 bits). The rotational motion of the electric motor MTR is reduced in speed by the speed reducer GSK, and is finally converted to the pressing force of the friction members MSB. In addition, the actual position Mka of the MTR is output as a digital signal. Therefore, the estimated pressing force value Fbe that is computed on the basis of Mka is a signal having a higher resolution than Fba. However, Fbe is an estimated value that assumes the spring constant (that is, stiffness value Gcp) of the BRK, so, as for the reliability of a signal, Fba is higher than Fbe (Fba has a smaller error from a true value than Fbe).

In the vehicle, in a region in which the degree of driver's operation of the brake pedal BP is small (that is, when Bpa is small), delicate adjustment of a vehicle deceleration (that is, minute control over the braking torque) is required in correspondence with slight operation of the BP. On the other hand, when the driver requires a high vehicle deceleration (that is, when Bpa is large), the operation amount of the BP and the vehicle deceleration are required to have a certain relationship.

On the basis of the first and second contribution degrees (coefficients that determine the influence degrees in computing Fbx) Ka1, Ke2, when the braking operation amount Bpa is small, the second contribution degree Ke2 of Fbe is set so as to be relatively larger than the first contribution degree Ka1 of Fba, and the resultant pressing force Fbx is determined by mainly Fbe (or only Fbe), so the resolution of the pressing force feedback control is improved, and precise braking torque control may be executed. In addition, with an increase in Bpa, the first contribution degree Ka1 of Fba is increased, the second contribution degree Ke2 of Fbe is reduced, and the resultant pressing force Fbx is computed on the basis of Fba and Fbe. When the braking operation amount Bpa is large, the first contribution degree Ka1 of Fba is set so as to be relatively larger than the second contribution degree Ke2 of Fbe, the resultant pressing force Fbx is determined by mainly Fba (or only Fba), so the reliability of the pressing force feedback control may be improved.

When Braking Torque is Reduced

Figure 6:
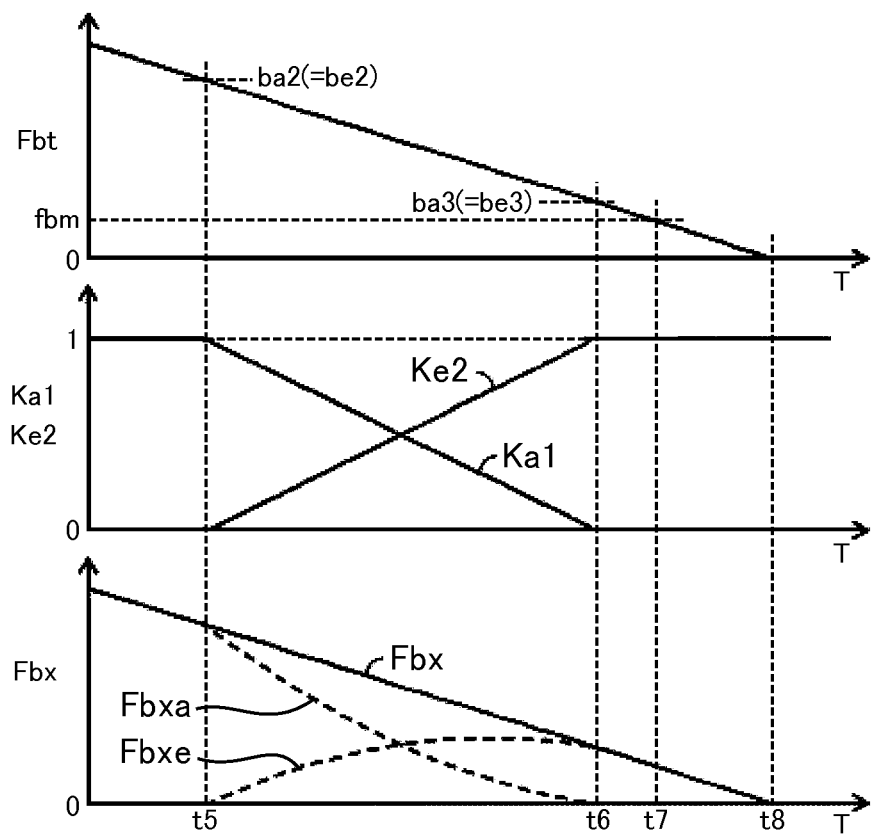
FIG. 6 is a time chart that shows an example of computation of the resultant pressing force in the case where the braking operation amount is reduced.

FIG. 6 is a time-series chart in the case where the braking operation amount Bpa is reduced toward zero (not braking) and the braking torque that is applied to each wheel WHL is reduced. As in the case where the braking torque is increased as shown in FIG. 5, the case where Fbt (which corresponds to a value corresponding to Bpa) is employed, the predetermined value ba2 is set so as to be equal to the predetermined value be2 and the predetermined value ba3 (<ba2 and >ba1) is set so as to be equal to the predetermined value be3 (<be2 and >be1) is illustrated in determining the first and second contribution degrees Ka1, Ke2 (see FIG. 2). Similarly, instead of Fbt, at least one of Bpa, Fba and Mka may be employed, and the predetermined values may have such a relationship that ba2≠be2 and/or ba3≠be3. The predetermined values ba3, be3 are set to values larger than a value corresponding to the torque loss fmb (see FIG. 7) in the BRK. That is, when Bpa is reduced, the braking operation amount corresponding value (for example, Bpa) reaches the values ba3, be3 before the ineffective displacement mkm begins to arise.

As well as the above case, when the driver starts operation to return the braking operation member BP, the target pressing force Fbt is gradually reduced with a reduction in Bpa. When Fbt is large (that is, when the value corresponding to Bpa is large), the first contribution degree Ka1 is computed to a relatively large value, and the second contribution degree Ke2 is computed to a relatively small value. With a reduction in Fbt, Ka1 is reduced, and Ke2 is increased. For example, under the condition that Fbt≥ba2, Ka1 is computed to one and Ke2 is computed to zero. At time t5, as Fbt becomes smaller than the predetermined value ba2, Ka1 is reduced from one, and Ke2 is increased from zero. At time t6, when the condition that Fbt≤ba3 (=be3) is satisfied, Ka1 is computed to zero and Ke2 is computed to one.

By adjusting the first and second contribution degrees Ka1, Ke2, when the Bpa corresponding value (the value corresponding to the braking operation amount) is larger than or equal to the predetermined value ba2, the resultant pressing force Fbx is computed on the basis of only Fba. When the Bpa corresponding value is larger than the predetermined value ba3 and smaller than the predetermined value ba2, the resultant pressing force Fbx is computed on the basis of the actual pressing force value Fba and the estimated pressing force value Fbe (that is, the electric motor position Mka). When the Bpa corresponding value is smaller than or equal to the predetermined value ba3, the resultant pressing force Fbx is computed on the basis of only the estimated pressing force value Fbe. The value corresponding to the braking operation amount Bpa (Bpa corresponding value) is computed on the basis of at least one of the braking operation amount Bpa, the target pressing force Fbt, the actual pressing force value Fba and the electric motor position Mka.

The predetermined value ba3 is set so as to be larger than a value corresponding to the value fbm corresponding to the friction loss of the electric motor MTR, and the like. The friction loss value fbm of the electric motor MTR, and the like, is converted to the same physical quantity as the Bpa corresponding value via the specifications of the braking means BRK, and the predetermined value ba3 is set. Therefore, in the region in which the ineffective displacement (see mkm in FIG. 7) arises, the pressing force feedback control is executed on the basis of only the estimated pressing force value Fbe. Specifically, before time (t7) at which the ineffective displacement arises (at time t6), the actual value component Fbxa of the pressing force is set to zero (Fba is not employed in computing Fbx), and the estimated value component Fbxe of the pressing force is computed as Fbx. The value fbm may be determined in advance by an experiment, or the like, so the predetermined values ba3, be3 may be set in advance as fixed values. Mka and Fba may be stored in association with each other at the time of previous braking operation, and the value fbm may be determined by extracting the ineffective displacement section mkm on the basis of the stored data.

Even when the braking torque is reduced, similar operation and advantageous effect (both resolution and reliability of detecting the pressing force) to those in the case where the braking force is increased are obtained by adjusting the first and second contribution degrees Ka1, Ke2. In addition, because the predetermined values ba3, be3 are set so as to be larger than the value fbm corresponding to the friction loss of the BRK, unnecessary energization to the electric motor due to the ineffective displacement can be suppressed.

Summary of Embodiment According to Invention of Present Application

Hereinafter, the embodiment according to the invention of the present application will be summarized.

The electric braking system for a vehicle according to the invention of the present application includes operation amount acquisition means (BPA) for acquiring a driver's operation amount (Bpa) of a braking operation member (BP) of the vehicle, braking means (BRK) for generating a braking torque in a wheel (WHK) by transmitting power of an electric motor (MTR) via a transmission member (GSK, and the like) to press a friction member (MSB) against a rotary member (KTB) fixed to the wheel (WHL) of the vehicle, and control means (CTL) for computing a target energization amount (Imt) on the basis of the operation amount (Bpa) and controlling the electric motor (MTR) on the basis of the target energization amount (Imt). The electric braking system for a vehicle further includes pressing force acquisition means (FBA) for acquiring an actual pressing force value (Fba) that is an actual value of a force that the friction member (MSB) presses the rotary member (KTB), and position acquisition means (MKA) for acquiring a position (Mka) of the electric motor (MTR). The control means (CTL) computes an estimated pressing force value (Fbe) that is an estimated value of the force that the friction member (MSB) presses the rotary member (KTB) on the basis of the position (Mka), determines a first contribution degree (Ka1) for the actual pressing force value (Fba) and a second contribution degree (Ke2) for the estimated pressing force value (Fbe) on the basis of the operation amount (Bpa), determines the second contribution degree (Ke2) as a relatively larger value than the first contribution degree (Ka1) when the operation amount (Bpa) is small, determines the first contribution degree (Ka1) as a relatively larger value than the second contribution degree (Ke2) when the operation amount (Bpa) is large, and computes the target energization amount (Imt) on the basis of a value (Fbxa) that is obtained from the actual pressing force value (Fba) in consideration of the first contribution degree (Ka1) and a value (Fbxe) that is obtained from the estimated pressing force value (Fbe) in consideration of the second contribution degree (Ke2).

Specifically, in the electric braking system for a vehicle according to the embodiment of the invention of the present application, the control means (CTL) may be configured to carry out computation so as to increase the first contribution degree (Ka1) and reduce the second contribution degree (Ke2) as the operation amount (Bpa) increases.

In the braking operation, when the vehicle deceleration is small, minute adjustment of the braking torque is regarded as important. With an increase in vehicle deceleration, it is required that the magnitude of a generated deceleration to a braking operation amount not fluctuate for each braking operation (that is, the relationship be constant). The target energization amount Imt is computed on the basis of the actual pressing force value Fba and the estimated pressing force value Fbe that is obtained from Mka. The stiffness characteristic (the characteristic of a force to a displacement, and the spring constant) of the overall BRK has a downward convex characteristic (specifically, such a characteristic that the stiffness is low when the displacement is small and the stiffness increases with an increase in displacement). In the region in which Bpa is small, the contribution degree (the influence degree in computing Imt) of Fba is set to a relatively small value, and the contribution degree of Fbe is set to a relatively large value, so the resolution of the pressing force feedback control may be improved. In addition, the contribution degree of Fba is increased with an increase in Bpa, fluctuation factors (for example, an estimation error of Fbe) in the pressing force feedback control can be compensated.

The pressing force acquisition means FBA not only directly acquires (detects) the pressing force Fba but also may acquire a force-related state quantity of any movable member in a power transmission path from the electric motor MTR to the friction members MSB as the actual pressing force value (actual pressing force) Fba. The specifications of the braking means BRK (for example, the gear ratio of the GSK, the lead of the NJB, and the like) are known, so the FBA acquires at least one of the output torque of the electric motor MTR, the output torque of the GSK, the thrust of the NJB, the thrust of the PSN and the pressing force of the MSBs. The actual pressing force value Fba may be indirectly acquired (computed) on the basis of the specifications of the BRK (the gear ratio of the GSK, the lead of the NJB, and the like).

Similarly, the position acquisition means MKA may acquire a position-related state quantity of any movable member in the power transmission path from the electric motor MTR to the friction members MSB as the position (actual position) Mka. In this case as well, the MKA may acquire at least one of the position of the electric motor MTR, the position of the GSK, the position of the NJB, the position of the PSN and the position of the MSBs. The electric motor position Mka may be indirectly acquired (computed) on the basis of the specifications of the BRK.

In the electric braking system for a vehicle according to the embodiment of the invention of the present application, when a value (Bpa, Fbt, Fba, Mka) corresponding to the operation amount (Bpa) is smaller than a first predetermined value (ba1), the control means (CTL) may set the first contribution degree (Ka1) to zero.

In the region in which Bpa is small (that is, the vehicle deceleration required by the driver is small), the resolution of the absolute value of the pressing force is more required than the accuracy (reliability, and an error from a true value is small) of the absolute value of the pressing force. That is, the controllability of the vehicle deceleration has a higher priority. Therefore, when Bpa is small, the actual pressing force value Fba is not employed in computing Imt, but Imt is computed on the basis of only the estimated pressing force value Fbe. Because the estimated value Fbe has a higher resolution of the pressing force than the actual value Fba, high-accuracy pressing force feedback control can be executed in the region in which the pressing force is small.

In the electric braking system for a vehicle according to the embodiment of the invention of the present application, when the value (Bpa, Fbt, Fba, Mka) corresponding to the operation amount (Bpa) is larger than a second predetermined amount (be2), the control means (CTL) may set the second contribution degree (Ke2) to zero.

In the region in which Bpa is large (that is, the vehicle deceleration required by the driver is large), the accuracy (reliability, and an error from a true value is small) of the absolute value of the pressing force is obtained. That is, the magnitude of the vehicle deceleration is important. Therefore, when Bpa is large, the estimated pressing force value Fbe is not employed in computing Imt, and Imt is computed on the basis of only the actual pressing force value Fba. The estimated value Fbe is computed on the basis of the stiffness of the BRK; however, the stiffness of the BRK changes with the friction, and the like, of the MSBs. In the region in which the pressing force is large, control is executed by only the actual pressing force value Fba, and the influence of the stiffness of the BRK (fluctuation factor) is removed. Therefore, accurate pressing force feedback control having a high reliability can be executed.

In the electric braking system for a vehicle according to the embodiment of the invention of the present application, the control means (CTL) may be configured to compute a position variation (Mkh) on the basis of the actual position (Mka), compute a pressing force variation (Fbh) corresponding to the position variation (Mkh) on the basis of the actual pressing force value (Fba), and store a characteristic (CHgc) for computing the estimated pressing force value (Fbe) on the basis of the position variation (Mkh) and the pressing force variation (Fbh).

The stiffness of the overall BRK changes with time because of abrasion, or the like, of the friction members MSB. The computing map CHgc that takes the stiffness characteristic of the BRK into consideration is stored. With the above configuration, because CHgc is computed on the basis of the position variation Mkh and the pressing force variation Fbh, errors (such as a drift) of detected signals can be compensated. As a result, the accuracy of estimating the estimated pressing force value Fbe can be ensured.

In the electric braking system for a vehicle according to the embodiment of the invention of the present application, pressing force state determination means (FLFB) for determining whether the pressing force acquisition means (FBA) is normal may be provided, and the control means (CTL) may be configured to, when the pressing force state determination means (FLFB) determines that the pressing force acquisition means (FBA) is not normal (FLfb=1), set the first contribution degree (Ka1) to zero and increase the second contribution degree (Ke2).

Similarly, in the electric braking system for a vehicle according to the embodiment of the invention of the present application, position state determination means (FLMK) for determining whether the position acquisition means (MKA) is normal may be provided, and the control means (CTL) may be configured to, when the position state determination means (FLMK) determines that the position acquisition means (MKA) is not normal (FLmk=1), increase the first contribution degree (Ka1) and set the second contribution degree (Ke2) to zero.

In addition, in the electric braking system for a vehicle according to the embodiment of the invention of the present application, the pressing force acquisition means (FBA) may use a value based on a digital signal obtained by analog-to-digital converting an analog signal output from an element (strain gauge, or the like) that detects a force that the friction member (MSB) presses the rotary member (KTB) as an actual pressing force value (Fba). The position acquisition means (MKA) may use a value based on a digital signal directly output from an element (Hall IC, resolver, encoder, or the like) that detects a position of the electric motor (MTR) as a position (Mka) of the electric motor (MTR).

Another Embodiment According to Invention of Present Application

Figure 8:
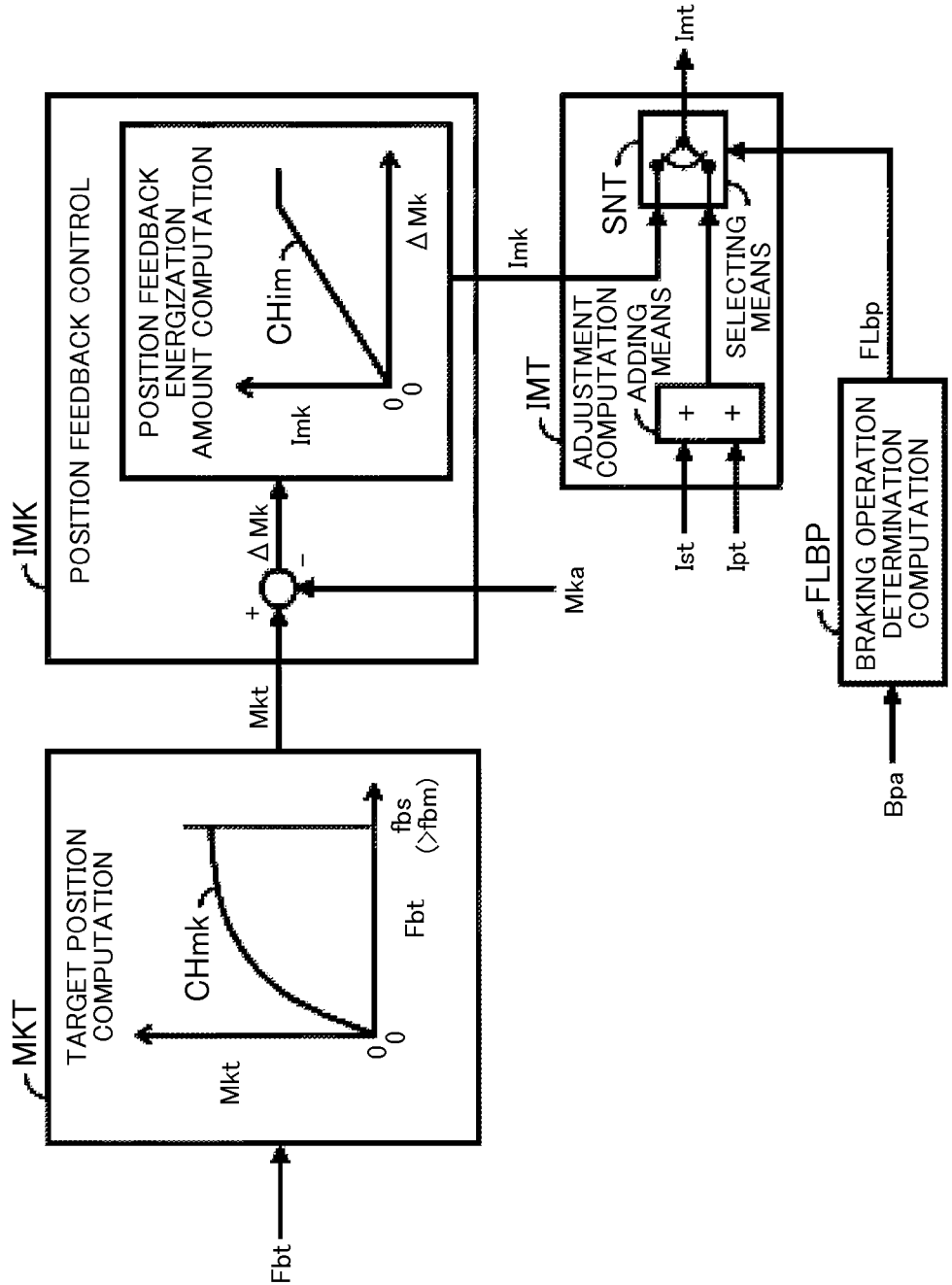
FIG. 8 is a functional block diagram corresponding to FIG. 1 according to another embodiment of the invention.

In the above-described resultant pressing force computing block FBX, unnecessary energization due to the ineffective displacement is prevented by adjusting the first and second contribution degrees Ka1, Ke2. Hereinafter, another embodiment will be described with reference to the functional block diagram of FIG. 8. It is determined whether the braking operation member BP is in a returned state and falls within the above-described predetermined range. When affirmative determination is made, the control for the pressing member PSN is switched from feedback control based on the pressing force to feedback control based on the position. Hereinafter, the process of each computation will be described.

In a braking operation determination computing block FLBP, it is determined on the basis of the operation amount Bpa of the braking operation member BP whether the BP is returned by the driver (that is, Bpa is reduced) and Bpa falls within the range from zero (not braking) to the predetermined value ba3. When the BP is in the returned state where Bpa reduces and the condition that 0≤Bpa<ba3 is satisfied, the control flag FLbp is output as one. When Bpa is constant or increases, the BP is not in the returned state, and the control flag FLbp is output as zero. When Bpa≥ba3 as well, negative determination is made as to the above-described determination condition, and FLbp set to zero is output. In the braking operation determination computing block FLBP, FLbp set to zero is set as an initial value. The predetermined value ba3 is set to a value larger than a value corresponding to the torque loss fbm in the BRK.

In a target position computing block MKT, a target position (target rotation angle) Mkt of the electric motor is computed on the basis of the target pressing force Fbt and a preset target position computing characteristic (computing map) CHmk. Specifically, with an increase in the target pressing force Fbt, the target position Mkt is increased in the upward convex characteristic. In the target position computing block MKT, the target position Mkt is computed within the range of the target pressing force Fbt from zero to a predetermined value fbs (which corresponds to a predetermined range of the braking operation amount Bpa, including zero). The predetermined value fbs is a value converted from the value ba3 by using the specifications, and the like, of the braking means, and is a value larger than the value fbm corresponding to the friction loss that causes the ineffective displacement (ineffective rotation angle). That is, the target position Mkt of the electric motor is computed only within the range including the braking operation amount Bpa equal to zero (not braking) and the friction loss value fbm.

In a position feedback control block IMK, the actual position of the electric motor (that is, the actual position of the pressing member PSN) is controlled so as to approach a target value on the basis of the target position Mkt and the actual position Mka. That is, the position feedback energization amount Imk is computed on the basis of a deviation ΔMk between the target position Mkt and the actual position Mka such that ΔMk reduces. Imk is a target value of the energization amount to the electric motor MTR, which is required to bring Mka into coincidence with Mkt.

In the position feedback control block IMK, initially, the deviation ΔMk (=Mkt−Mka) between the target position Mkt and the actual position Mka is computed. The position feedback energization amount (target value) Imk is computed on the basis of the position deviation ΔMk and the computing characteristic (computing map) CHim. A computing map CHim is set such that Imk increases as ΔMk increases.

The position feedback energization amount Imk is transmitted to the adjustment computing block IMT, and is adjusted with the target value (Ist, or the like) of another energization amount. A selection computing block SNT is included in the adjustment computing block IMT. In the selection computing block SNT, the energization target value based on the actual pressing force value Fba (specifically, the sum of Ist and Ipt, and see FIG. 1) and the energization target value Imk based on the electric motor position Mka are switched in accordance with the control flag FLbp. Specifically, in the braking operation determination computing block FLBP, when negative determination is made on at least one of the condition that the braking operation member is in the returned state and the condition that 0≤Bpa<ba3 (FLbp=0), the sum (Ist+Ipt) of the command energization amount Ist and the pressing force feedback energization amount Ipt is computed as the target energization amount Imt. When affirmative determination is made on both the condition that the braking operation member is in the returned state and the condition that 0≤Bpa<ba3 (FLbp=1), the position feedback energization amount Imk is computed as the target energization amount Imt.

When the braking operation member BP is increased (depressed) by the driver and the BP is returned, but when Bpa is sufficiently large (that is, the actual pressing force Fba is sufficiently larger than the value fbm corresponding to the friction loss), feedback control is executed on the basis of the force (actual pressing force) Fba that is acting on the pressing member PSN. As the BP is returned and Fba approaches the value fbm (that is, as Bpa becomes smaller than the predetermined value ba3), feedback control is executed on the basis of the electric motor position. The value ba3 is larger than the friction loss value fbm and is a predetermined value in the physical quantity of Bpa converted by the computing characteristic, the specifications (gear ratio, screw lead, and the like) of the BRK. The above-described position feedback control is executed over the range of Bpa from zero (not braking) to the predetermined value ba3. When the BP is depressed or when the BP is returned but the operation amount Bpa is sufficiently large, the target energization amount Imt is computed on the basis of at least the actual pressing force value Fba, so electric motor control having a high reliability (based on the pressing force having a small error from a true value) can be executed. On the other hand, when the BP is returned toward a non-braking position (Bpa=0) and the operation amount Bpa is small, the target energization amount Imt is computed on the basis of only the electric motor position Mka (that is, Fba is not employed in the feedback control), so unnecessary energization to the electric motor due to the ineffective displacement can be suppressed.

Because the target pressing force Fbt is computed on the basis of the computing characteristic CHfb and the braking operation amount Bpa, there is a correlation between Fbt and Bpa. Therefore, the predetermined value fbs (a value larger than the friction loss fbm of the electric motor) in the target position computing block MKT is converted to the physical quantity of Bpa via the computing characteristic CHmk, and the converted value corresponds to the predetermined value ba3.

Speed Limitation on Electric Motor when Braking Operation Member is Returned When the braking operation member BP is rapidly returned (when rapidly released), there may be a case where return of the pressing member PSN becomes excessive because of an attempt to raise the control accuracy of the position feedback control. In order to suppress this phenomenon, a speed limitation may be set on the electric motor MTR.

Figure 9:
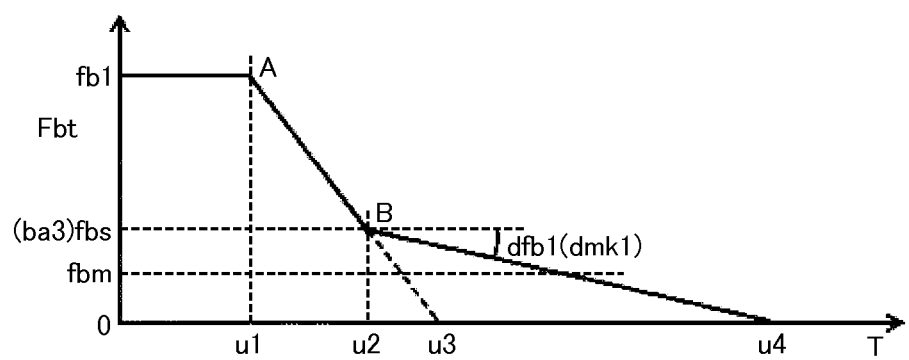
FIG. 9 is a time chart for illustrating a speed limitation on the electric motor at the time when a braking operation member is returned.

Hereinafter, a speed limitation on the electric motor will be described with reference to the time chart of FIG. 9. FIG. 9 shows the case where the braking operation member BP is rapidly released by the driver. Until time u1, the target pressing force Fbt is set to a value fb1. At time u1, the target pressing force Fbt is rapidly reduced toward zero. At time u2 at which Fbt reaches the predetermined value fbs larger than the friction loss value fbm (or values ba3, be3 corresponding to the predetermined value fbs), a limitation is added to a reduction in Fbt, and Fbt reduces at a reduction gradient (temporal variation) dfb1. That is, in the region in which Fbt is smaller than the predetermined value fbs (or ba3, be3), a limitation (speed limitation) dmk1 corresponding to dfb1 is set on the rotation speed (speed in the reverse rotation) of the electric motor MTR.

When the electric motor MTR is rotated in the reverse direction and Fba is reduced, the position feedback control is started at the value fbs larger than the value fbm corresponding to the friction loss (that is, before reaching the ineffective displacement section mkm), and, in addition, the speed of the electric motor MTR is limited to the value dmk1. Therefore, unnecessary energization to the electric motor MTR is suppressed, and an overshoot of the MTR is suppressed, so excessive return of the PSN can be suppressed. Soon after the driver returns the BP, the driver may carry out rapid braking. Because excessive return is suppressed, an appropriate pressing force can be ensured in such a situation.

Summary of Embodiment According to Invention of Present Application

Hereinafter, the embodiment according to the invention of the present application will be summarized.

The electric braking system for a vehicle according to the invention of the present application includes operation amount acquisition means (BPA) for acquiring a driver's operation amount (Bpa) of a braking operation member (BP) of the vehicle, braking means (BRK) for generating a braking torque in a wheel (WHK) by transmitting power of an electric motor (MTR) via a transmission member (GSK, and the like) to press a friction member (MSB) against a rotary member (KTB) fixed to the wheel (WHL) of the vehicle, and control means (CTL) for computing a target energization amount (Imt) on the basis of the operation amount (Bpa) and controlling the electric motor (MTR) on the basis of the target energization amount (Imt). The electric braking system for a vehicle further includes pressing force acquisition means (FBA) for acquiring an actual pressing force value (Fba) that is an actual value of a force that the friction member (MSB) presses the rotary member (KTB), and position acquisition means (MKA) for acquiring a position (Mka) of the electric motor (MTR). Within a predetermined range of the operation amount (Bpa), including zero (0≤Bpa<ba3), the control means (CTL), when the operation amount (Bpa) increases, computes the target energization amount (Imt) on the basis of at least the actual pressing force value (Fba) such that the electric motor (MTR) is rotated in one direction, and, when the operation amount (Bpa) reduces, computes the target energization amount (Imt) on the basis of only the position (Mka) (that is, only Mka) such that the electric motor (MTR) is rotated in the other direction.

In the electric braking system for a vehicle according to the embodiment of the invention of the present application, the control means (CTL) may be configured to compute an estimated pressing force value (Fbe) corresponding to the actual pressing force value (Fba) on the basis of the position (Mka), determine a first contribution degree (Ka1) for the actual pressing force value (Fba) and a second contribution degree (Ke2) for the estimated pressing force value (Fbe) on the basis of the operation amount (Bpa) such that, a predetermined range of the operation amount (Bpa), including zero (0≤Bpa<ba3), includes a range of the operation amount (Bpa) in which the first contribution degree (Ka1) and the second contribution degree (Ke2) are set to values larger than zero when the operation amount (Bpa) increases, and the first contribution degree (Ka1) is kept at zero and the second contribution degree (Ke2) becomes a value larger than zero when the operation amount (Bpa) reduces (Ba1≤Bpa<ba3), and compute the target energization amount (Imt) on the basis of a value (Fbxa) that is obtained from the actual pressing force value (Fba) in consideration of the first contribution degree (Ka1) and a value (Fbxe) that is obtained from the estimated pressing force value (Fbe) in consideration of the second contribution degree (Ke2).

In the electric braking system for a vehicle according to the embodiment of the invention of the present application, determination means (FLBP) for determining whether the operation amount (Bpa) reduces and the operation amount (Bpa) falls within a predetermined range including zero (0≤Bpa<ba3) may be provided, the control means (CTL) may be configured to, when the determination means (FLBP) determines that the operation amount does not reduce (Bpa) or the operation amount (Bpa) does not fall within the predetermined range including zero (0≤Bpa<ba3) (FLbp=0), compute the target energization amount (Imt) on the basis of at least the actual pressing force value (Fba) (only the actual pressing force value (Fba) or both the actual pressing force value (Fba) and the position (Mka)) such that the electric motor (MTR) is rotated in one direction, and the control means (CTL) may be configured to, when the determination means (FLBP) determines that the operation amount (Bpa) reduces and the operation amount (Bpa) falls within the predetermined range including zero (0≤Bpa<ba3) (FLbp=1), compute the target energization amount (Imt) on the basis of only the position (Mka) (that is, only Mka) such that the electric motor (MTR) is rotated in the other direction.

When the braking operation amount Bpa falls within the predetermined range including zero (corresponding to non-braking state) (0 to ba3) and the braking operation amount Bpa is increased, at least the actual pressing force value Fba (only Fba or both Fba and Mka) is employed as a control variable, and feedback control over the electric motor is executed. Therefore, in the case where the pressing force is increased, the pressing force feedback control having a high reliability (based on the pressing force having a small error from a true value) may be executed.

On the other hand, when the braking operation amount Bpa is reduced, the actual pressing force value Fba is not employed, the position Mka of the electric motor is used solely as a control variable, and feedback control over the electric motor MTR is executed. Therefore, unnecessary energization to the electric motor, which arises in the ineffective displacement (in a state where the rotation angle of the electric motor changes but the pressing force does not change) due to the friction torque of the electric motor, can be suppressed.

In addition, in the electric braking system for a vehicle according to the embodiment of the invention of the present application, the control means (CTL) may be configured to, within a predetermined range of the operation amount (Bpa), including zero (0≤Bpa<ba3), when the operation amount (Bpa) is reduced, limit a speed of the electric motor (MTR).

Because a limitation is set on the speed of the electric motor MTR, an overshoot at the time when the MTR is rotated in the reverse direction and is returned to the zero-point position is suppressed, so extra return of the pressing member PSN can be suppressed. Therefore, just after the BP is released, the responsiveness at the time when rapid braking is carried out again can be improved.

In addition, in the electric braking system for a vehicle according to the embodiment of the invention of the present application, the pressing force acquisition means (FBA) may use a value on the basis of a digital signal obtained by analog-to-digital converting an analog signal output from an element (strain gauge, or the like) that detects a force that the friction member (MSB) presses the rotary member (KTB) as the actual pressing force value (Fba). Alternatively, the position acquisition means (MKA) may use a value on the basis of a digital signal directly output from an element (Hall IC, resolver, encoder, or the like) that detects a position of the electric motor (MTR) as a position (Mka) of the electric motor (MTR).

DESCRIPTION OF REFERENCE NUMERALS

BPA: operation amount acquisition means, MSB: friction member, KTB: rotary member, MTR: electric motor, BRK: braking means, CTL: control means, FBA: pressing force acquisition means, MKA: position acquisition means, Fba: actual pressing force value, Fbe: estimated pressing force value, Mka: electric motor position, Ka1: first contribution degree, Ke2: second contribution degree, Bpa: operation amount, Imt: target energization amount

The invention claimed is:

1. An electric braking system for a vehicle, comprising:
an operation amount sensor that acquires a driver's operation amount of a braking operation member of the vehicle;
a brake actuator that generates a braking torque in a wheel of the vehicle by transmitting power of an electric motor via a transmission member to press a friction member against a rotary member fixed to the wheel;
an electronic control unit configured to compute a target energization amount on the basis of the operation amount and control the electric motor on the basis of the target energization amount;
a pressing force sensor that acquires an actual pressing force value that is an actual value of a force that the friction member presses the rotary member; and
a position sensor that acquires a position of the electric motor, wherein
the electronic control unit is configured to
compute an estimated pressing force value that is an estimated value of the force that the friction member presses the rotary member on the basis of the position,
determine a first contribution degree for the actual pressing force value and a second contribution degree for the estimated pressing force value on the basis of the operation amount,
determine the second contribution degree as a relatively larger value than the first contribution degree when the operation amount is small, and determine the first contribution degree as a relatively larger value than the second contribution degree when the operation amount is large, and
compute the target energization amount on the basis of a value that is obtained from the actual pressing force value in consideration of the first contribution degree and a value that is obtained from the estimated pressing force value in consideration of the second contribution degree.

2. An electric braking system for a vehicle, comprising:
an operation amount sensor that acquires a driver's operation amount of a braking operation member of the vehicle;
a brake actuator that generates a braking torque in a wheel of the vehicle by transmitting power of an electric motor via a transmission member to press a friction member against a rotary member fixed to the wheel;
an electronic control unit configured to compute a target energization amount on the basis of the operation amount and control the electric motor on the basis of the target energization amount;
a pressing force sensor that acquires an actual pressing force value that is an actual value of a force that the friction member presses the rotary member; and
a position sensor that acquires a position of the electric motor, wherein
the electronic control unit is configured to
within a predetermined range of the operation amount, including zero,
when the operation amount increases, compute the target energization amount on the basis of at least the actual pressing force value such that the electric motor is rotated in one direction in which the braking torque increases, and, when the operation amount reduces, compute the target energization amount on the basis of only the position such that the electric motor is rotated in the other direction in which the braking torque reduces.

* * * * *